(12) United States Patent
Shepshelovich et al.

(10) Patent No.: US 10,196,129 B2
(45) Date of Patent: Feb. 5, 2019

(54) AEROFOIL AND WINGS FOR AIR VEHICLES

(71) Applicant: ISRAEL AEROSPACE INDUSTRIES LTD., Lod (IL)

(72) Inventors: Michael Shepshelovich, Ganei Tikva (IL); Danny Abramov, Rehovot (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 14/896,828

(22) PCT Filed: Jun. 8, 2014

(86) PCT No.: PCT/IL2014/050513
§ 371 (c)(1),
(2) Date: Dec. 8, 2015

(87) PCT Pub. No.: WO2014/199371
PCT Pub. Date: Dec. 18, 2014

(65) Prior Publication Data
US 2016/0137288 A1    May 19, 2016

(30) Foreign Application Priority Data
Jun. 10, 2013    (IL) .......................................... 226859

(51) Int. Cl.
*B64C 9/20* (2006.01)
*B64C 3/14* (2006.01)
(Continued)

(52) U.S. Cl.
CPC ................. *B64C 9/20* (2013.01); *B64C 3/14* (2013.01); *B64C 3/50* (2013.01); *B64C 9/323* (2013.01);
(Continued)

(58) Field of Classification Search
CPC .... B64C 9/20; B64C 3/14; B64C 3/50; B64C 9/323; B64C 21/02; B64C 9/16; B64C 9/32
See application file for complete search history.

(56) References Cited

U.S. PATENT DOCUMENTS 2,261,363 A * 11/1941 Griswold ................ B64C 9/146
244/204
3,921,942 A * 11/1975 Bracka ...................... B64C 9/16
244/87
(Continued)

FOREIGN PATENT DOCUMENTS

FR           53254      10/1945
GB          521190       5/1940

OTHER PUBLICATIONS

Perkins et al, "Airplane performance Stability and Control", p. 80, 1949.*
(Continued)

*Primary Examiner* — Assres H Woldemaryam
(74) *Attorney, Agent, or Firm* — Dorsey & Whitney LLP

(57) ABSTRACT

Two element aerofoils are provided, having an aerofoil chord, a primary element having a first leading edge and a first trailing edge, a secondary element having a second leading edge and a second trailing edge, a gap between the primary element and the secondary element, and an axial overlap between the first trailing edge and the second leading edge. The secondary element is deflectable with respect to the primary element about a fixed hinge point by a flap deflection angle. The secondary element is configured to operate in airbrake mode when deflected by a respective the flap deflection angle corresponding to a design airbrake deflection angle wherein to generate an airbrake drag. In at least some examples, the axial overlap is numerically greater than −0.5% of the aerofoil chord, at least for the design
(Continued)

airfoil SA-21 - conventional flap deflections, $\delta_{flap}$ = +25deg, positive overlap airbrake deflection angle. Also disclosed are methods for operating air vehicles, and methods for designing two-element aerofoils.

23 Claims, 17 Drawing Sheets

(51) Int. Cl.
   *B64C 9/32* (2006.01)
   *B64C 3/50* (2006.01)
   *B64C 21/02* (2006.01)
(52) U.S. Cl.
   CPC ........ *B64C 21/02* (2013.01); *B64C 2003/147* (2013.01); *B64C 2230/20* (2013.01); *Y02T 50/12* (2013.01); *Y02T 50/32* (2013.01)

(56) References Cited

U.S. PATENT DOCUMENTS

| | | | | |
|---|---|---|---|---|
| 5,207,400 | A * | 5/1993 | Jennings | B64C 9/16 244/216 |
| 5,551,651 | A * | 9/1996 | Hendrickson | B64C 9/16 244/215 |
| 5,735,485 | A * | 4/1998 | Ciprian | B64C 9/323 244/113 |
| 7,992,827 | B2 | 8/2011 | Shepshelovich et al. | |
| 8,109,473 | B2 | 2/2012 | Shepshelovich et al. | |
| 2004/0195464 | A1 * | 10/2004 | Vassberg | B64C 3/28 244/216 |
| 2005/0011994 | A1 * | 1/2005 | Sakurai | B64C 9/16 244/212 |
| 2006/0202089 | A1 * | 9/2006 | Reckzeh | B64C 9/20 244/215 |
| 2007/0051855 | A1 * | 3/2007 | Shmilovich | B64C 9/16 244/207 |
| 2007/0278353 | A1 * | 12/2007 | Shepshelovich | B64C 3/14 244/215 |
| 2007/0278354 | A1 * | 12/2007 | Shepshelovich | B64C 3/14 244/217 |
| 2011/0038727 | A1 * | 2/2011 | Vos | B64C 3/46 416/1 |
| 2011/0163205 | A1 * | 7/2011 | Shepshelovich | B64C 3/14 244/219 |
| 2011/0240803 | A1 * | 10/2011 | Shmilovich | B64C 3/50 244/214 |

OTHER PUBLICATIONS

Storms et al. (doc "Experimental Study of Lift-Enhancing Tabs on a Two-Element Airfoil").*
Nagel, A., and Shepshelovich, M., "Development of High-Lift UAV Wings", 24th AIAA Applied Aerodynamics Conference, San Francisco, Ca, Jun. 5-8, pp. 1-19, 2006.
Shepshelovich, M., "The Progress in Development of UAV Wings", International Conference ICAUV-2009, Bangalore, India, 2009.
Steinbuch, M., Marcus, B., Shepshelovich, M., "Development of UAV Wings—Subsonic Designs", 41st Aerospace Sciences Meeting, Reno, Nevada, Jan. 6-9, 2003.
International Search Report and Written Opinion from International Application No. PCT/IL2014/050513 dated Sep. 22, 2014.
McCormick, B. W., "Aerodynamics Aeronautics and Flight Mechanics", John Wiley & Sons, book, 2nd edition, 1994 (pp. 85-102).
Abbott, I. H. and Von Doenhoff, A. E., "Theory of Wing Sections", Dover Publication, book, 1959 (pp. 188-246).

* cited by examiner

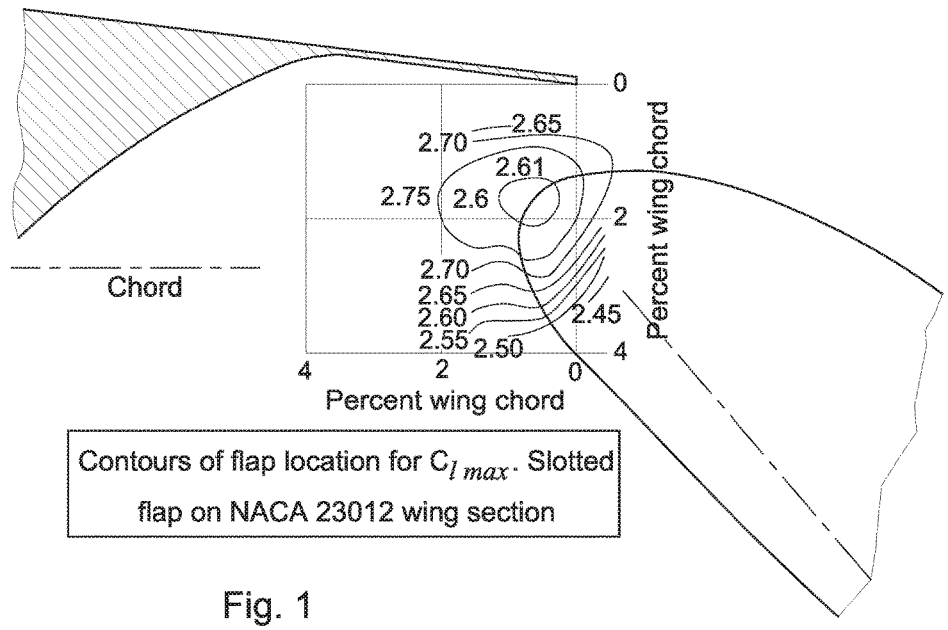
Fig. 1
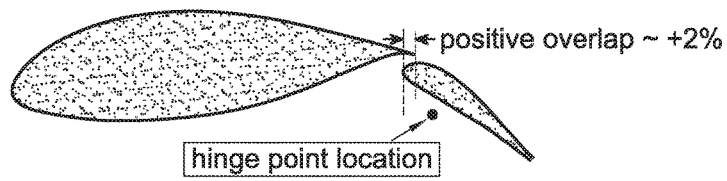
Fig. 2(a) airfoil SA-21 - conventional flap deflections, $\delta_{flap}$ = +25deg, positive overlap
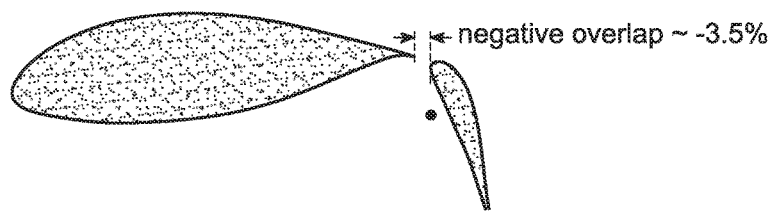
Fig. 2(b) airfoil SA-21 - large flap deflections, $\delta_{flap}$= +60deg, negative overlap, continuation of simple mechanical rotation around hinge point

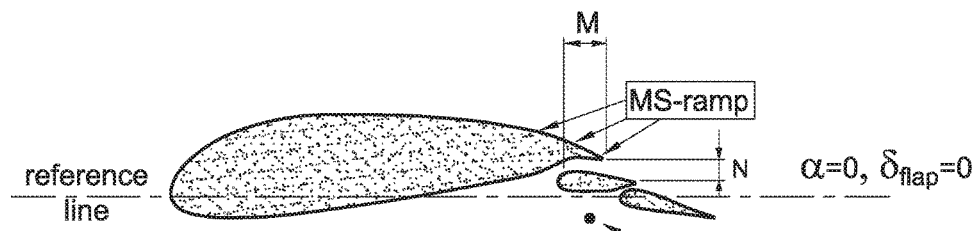
Fig. 7(a) nominal flap setting, $\delta_{flap} = 0°$
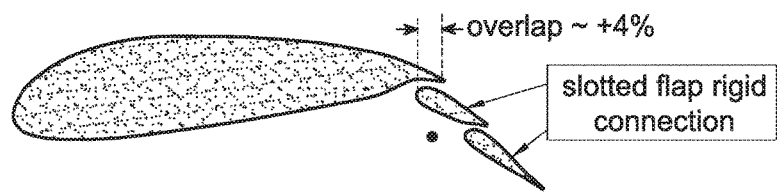
Fig. 7(b) maximum conventional flap deflection, $\delta_{flap} = +25°$
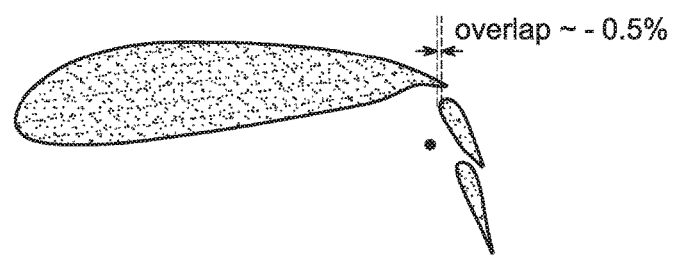
Fig. 7(c) deployed airbrake, $\delta_{flap} = +60°$

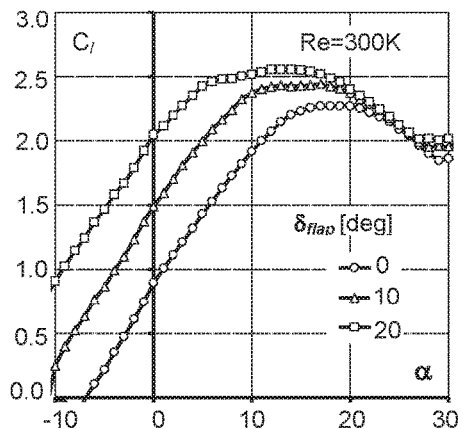
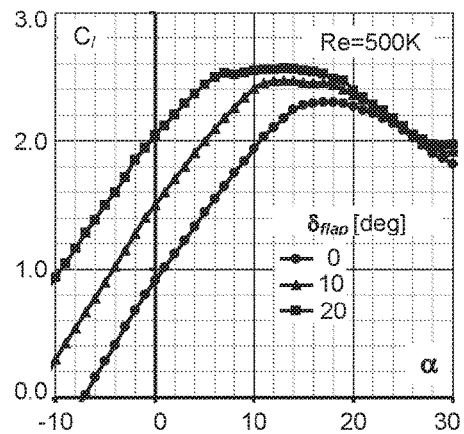
Fig. 8(a)  Fig. 8(b)
Lift curves of airfoil SA-MS/17-MLS for conventional positive flap deflections
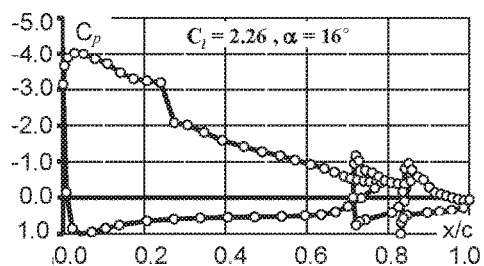
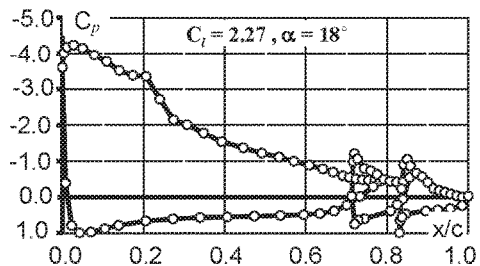
Fig. 9(a)  Fig. 9(b)
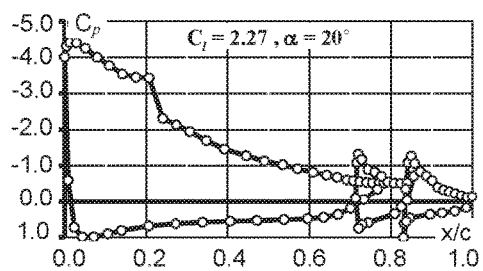
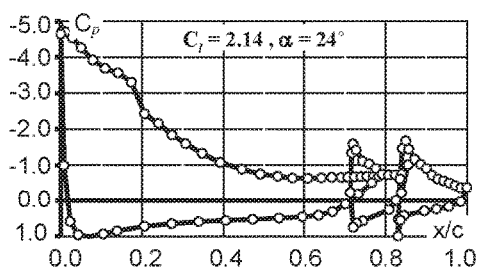
Fig. 9(c)  Fig. 9(d)
Airfoil SA-MS/17-MLS - pressure distributions at post-stall angles of attack, $\delta_{flap}=0$, WT test, Re=300K Airfoil SA-MS/17-MLS – pressure distributions at post-stall angles of attack, $\delta_{flap}$=+20deg, WT test, Re=300K

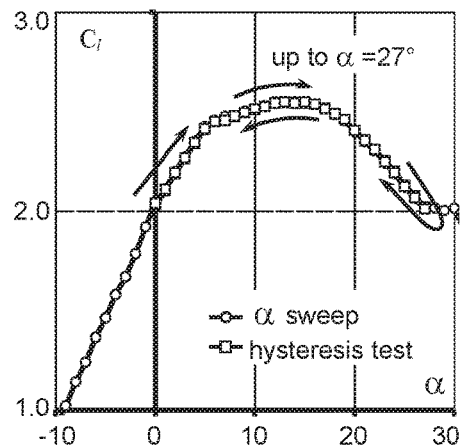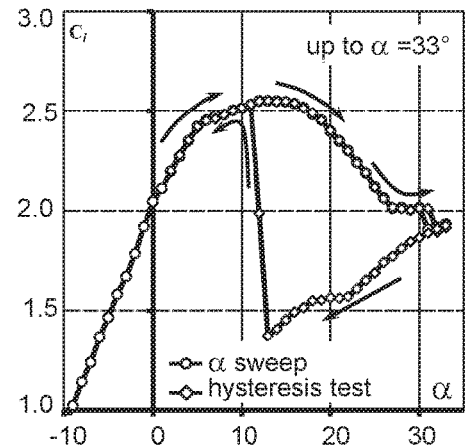
Fig. 12(a)  Fig. 12(b)
Airfoil SA-MS/17-MLS – hysteresis test, $\delta_{flap}=0$, Re=300K
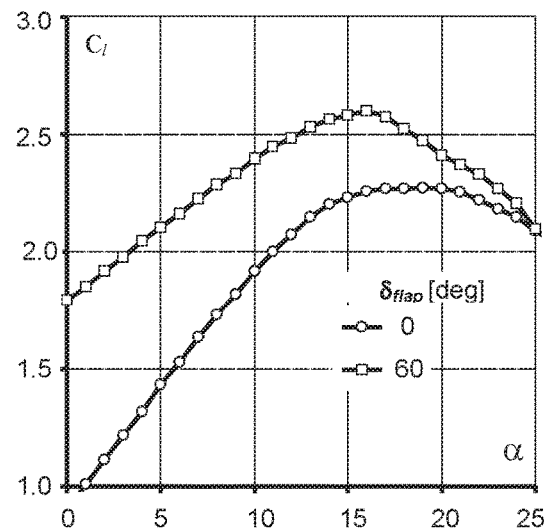
Lift curve of airfoil with deployed airbrake, WT test, Re=300K
Fig. 13

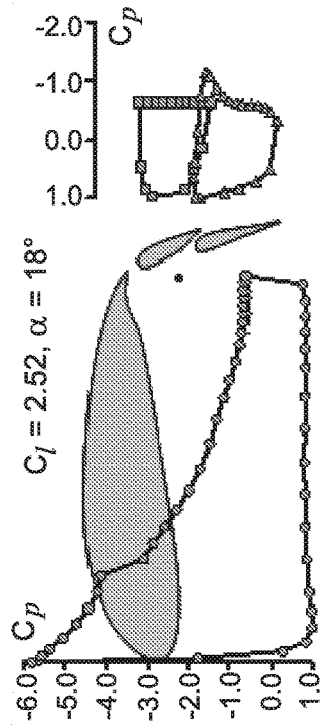
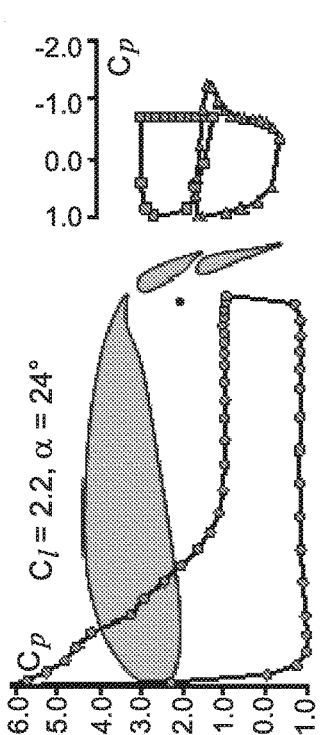
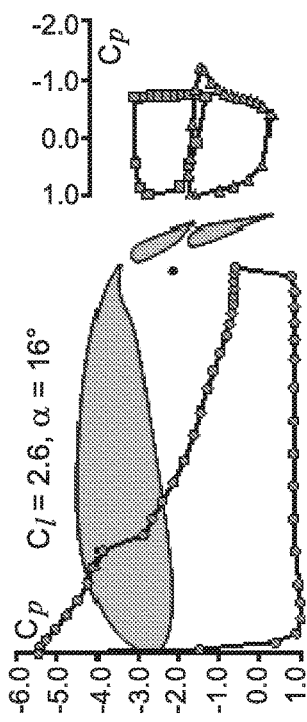
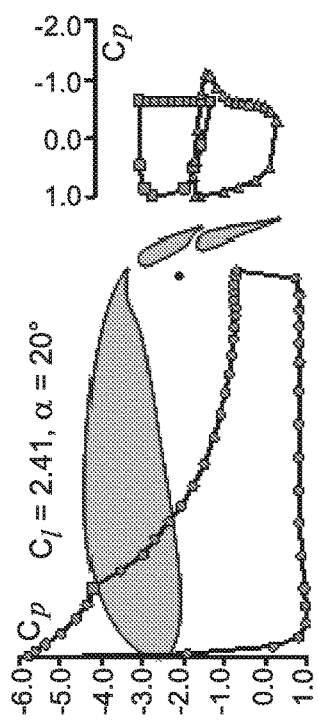
Fig. 14(a) $C_l = 2.6, \alpha = 16°$
Fig. 14(b) $C_l = 2.52, \alpha = 18°$
Fig. 14(c) $C_l = 2.41, \alpha = 20°$
Fig. 14(d) $C_l = 2.2, \alpha = 24°$
Pressure distributions at post-stall for airfoil with deployed airbrake, $\delta_{flap} = +60$ deg, Re=300K Maximum lift of conventional and new airbrake concept

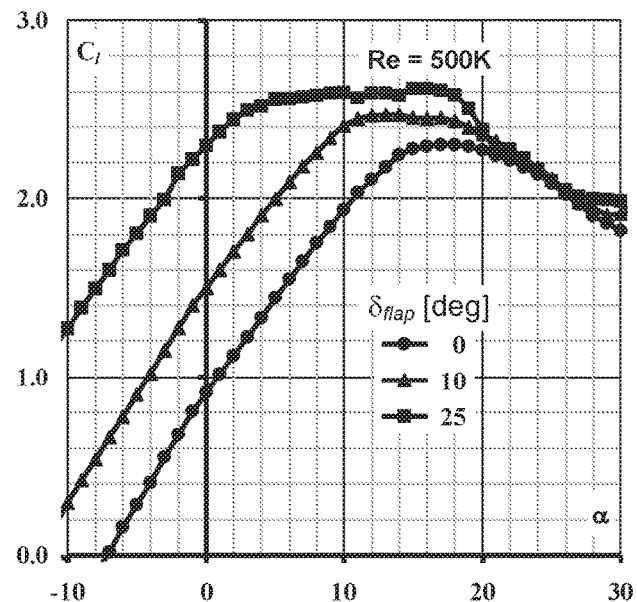
Fig. 17(a) conventional flap deflections
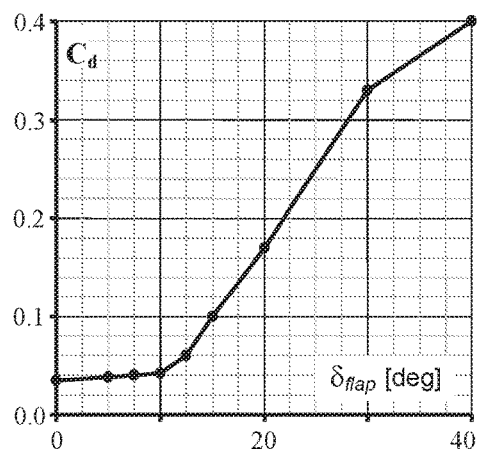
Fig. 17(b) airbrake drag
Airfoil SA-MS/17MLS – lift curves and drag of new airbrake concept Glide angle vs aerodynamic efficiency – simplified estimations Fig. 19 UAV AK-60 - general dimensions

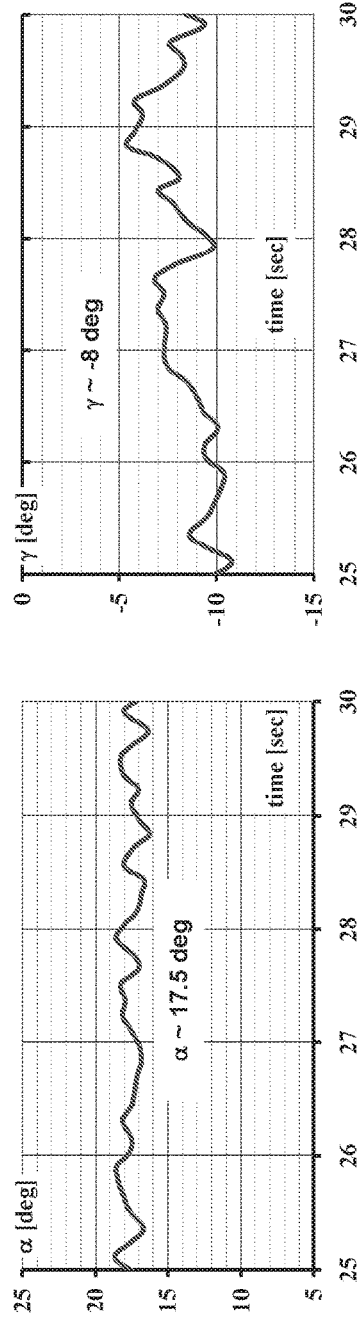
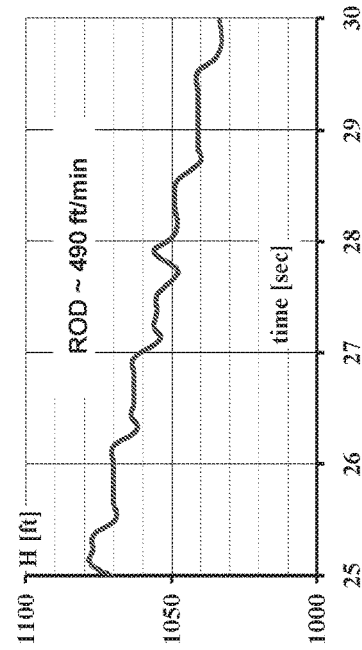
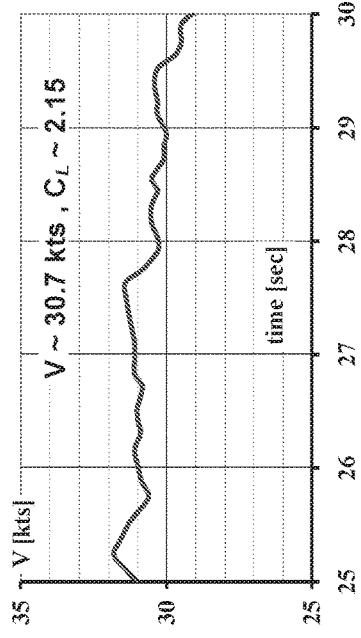
Fig. 21(a)
Fig. 21(b)
Fig. 21(c)
Fig. 21(d)

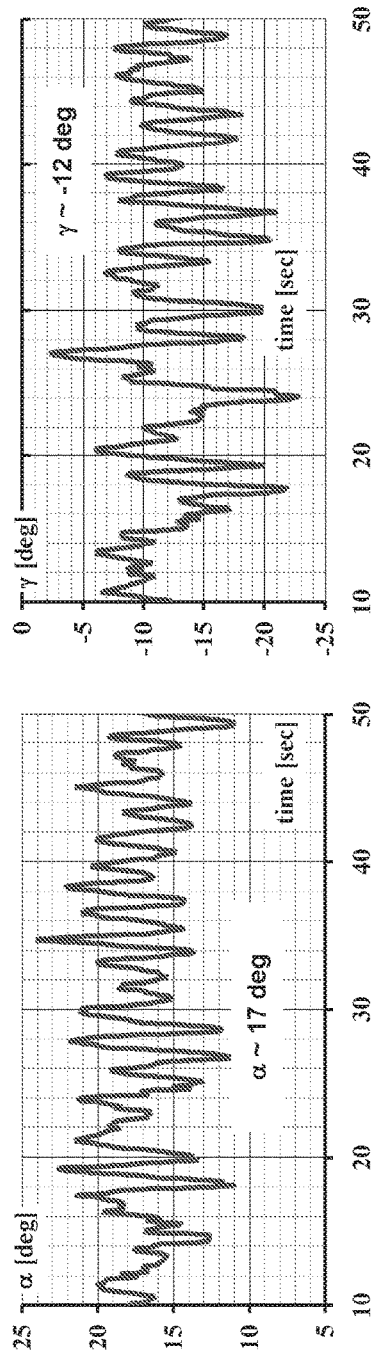
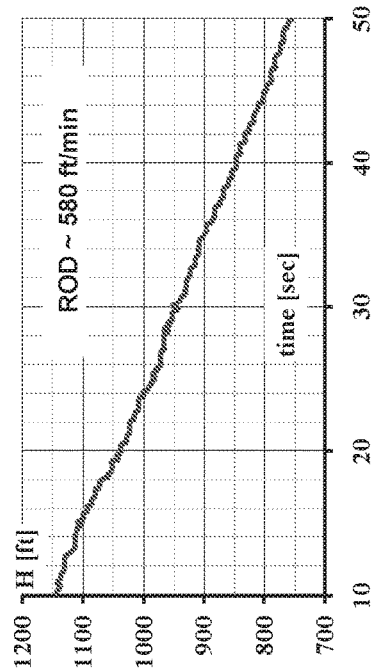
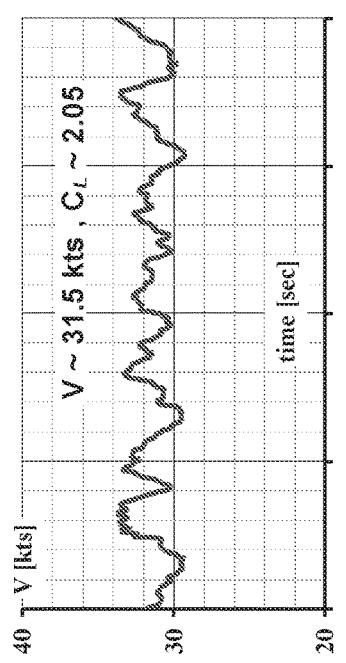
Fig. 22(a)  Fig. 22(b)  Fig. 22(c)  Fig. 22(d)

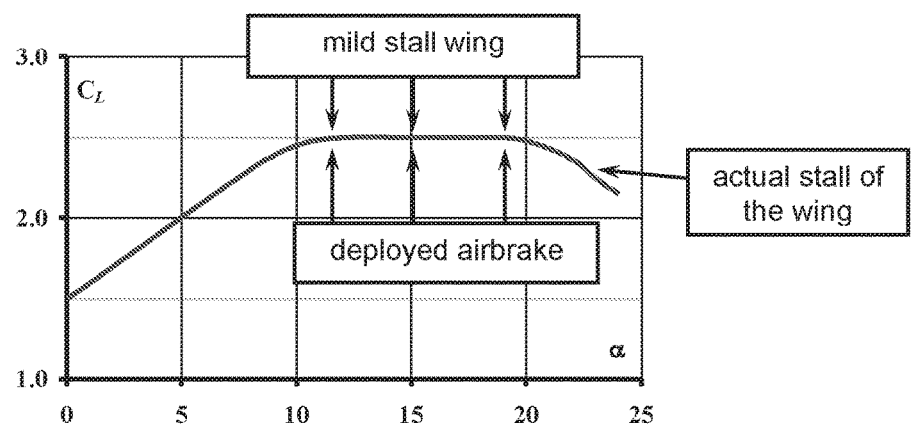
Fig. 23
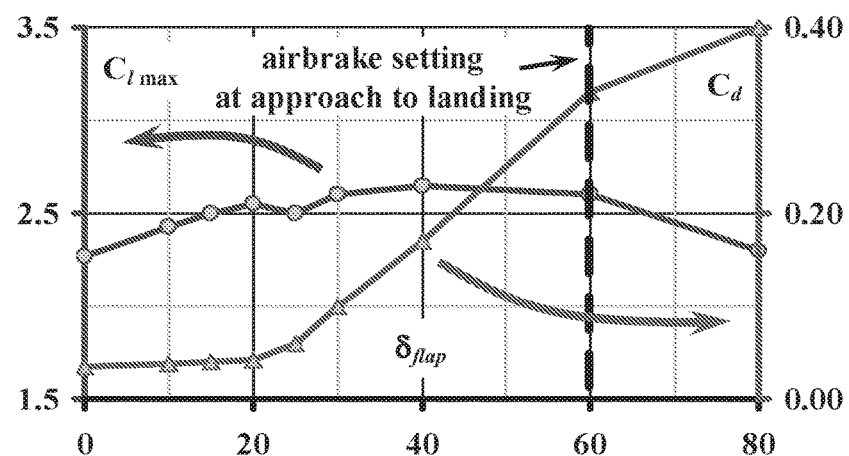
Fig. 24 Maximum lift and drag of new airbrake

AEROFOIL AND WINGS FOR AIR VEHICLES

TECHNOLOGICAL FIELD

The presently disclosed subject matter relates to slotted aerofoils and corresponding wing configurations for aircraft, in particular to aerofoils and wings therefor having air brakes. The presently disclosed subject matter relates to methods for operating air vehicles, and to methods for designing airfoils.

PRIOR ART

References considered to be relevant as background to the presently disclosed subject matter are listed below:
1. U.S. Pat. No. 8,109,473 "Slotted High Lift Airfoils", Issued date—Feb. 7, 2012, Filing date—May 29, 2007.
2. Nagel, A., and Shepshelovich, M., "Development of High-Lift UAV Wings", 24$^{th}$ AIAA Applied Aerodynamics Conference, San Francisco, Ca, 5-8 Jun. 2006.
3. Shepshelovich, M., "The Progress in Development of UAV Wings", International Conference ICAUV-2009, Bangalore, India, 2009
4. Steinbuch, M., Marcus, B., Shepshelovich, M., "Development of UAV Wings Subsonic Designs", 41$^{st}$ Aerospace Sciences Meeting, Reno, Nev., 6-9 January, 2003.
5. McCormick, B. W., "Aerodynamics Aeronautics and Flight Mechanics", John Wiley & Sons, book, 2$^{nd}$ edition, 1995.
6. U.S. Pat. No. 7,992,827 "Wings for Aircraft", issued date—Aug. 9, 2011, Filing date—May 21, 2007
7. Abbott, I. H. and Von Doenhoff, A. E., "Theory of Wing Sections", Dover Publication, book, 1959.

Acknowledgement of the above references herein is not to be inferred as meaning that these are in any way relevant to the patentability of the presently disclosed subject matter.

BACKGROUND

Two-element slotted aerofoils are well known, and are disclosed for example in U.S. Pat. No. 8,109,473 and U.S. Pat. No. 7,992,827, assigned to the present assignee.

Slotted aerofoils are two-element aerofoils composed of a first element (the main aerofoil body), and a second element (for example in the form of a flap or aileron). The second element is separated from the first element by a slot which is open for the airflow at any deflection of the second element. In one class of such slotted aerofoils, the slot is permanent, and facilitates actuation of the second element through positive or negative deflection angles. Such slotted aerofoils can be designed for cruising/loitering flight at high lift coefficients, and rely on a second element rotation around an external fixed hinge point for adjustment of the aerofoil to different flight regimes.

In general, stall characteristics of such aerofoils tend to deteriorate as maximum lift is increased, resulting in more difficulties when attempting to comply with considerations of flight safety and to avoid unfavorable stall patterns. This is especially relevant for high-lift, long endurance wings of some UAV's, such as for example the Heron high-lift long endurance UAV, manufactured by IAI, Israel. In the Heron UAV, optimum endurance performance is achieved via high loitering lift coefficients, which requires high maximum lift.

However, in some cases, such slotted aerofoils are configured to provide mild-stall characteristics at high lift, resulting in a smooth plateau of lift coefficients at post-stall angles of attack. Specifically, mild stall is characterized by almost constant level of the lift at post-stall domain and is associated with slowly creeping trailing edge separation that moderates the rate of lift losses at high angles of attack, typically resulting in an approximately constant lift coefficient (up to about 5% of the maximum lift coefficient for at least about 7° after the stall angle of attack, or within between about 5% and about 10% of the maximum lift coefficient for at least about 5° after the stall angle of attack).

The stall angle of attack can be defined as the angle of attack at which maximum lift coefficient (or up to about 99% of maximum lift coefficient) is first realized. The stalling speed is dependent on the weight (W) of the air vehicle, maximum lift coefficient ($C_{L\ max}$), wing area ($S_w$), and air density ($\rho$), and is generally defined as $$V_{stall} = (2W/(\rho * C_{L\ max} * S_w))^{0.5}$$

For example, mild-stall characteristics at an extended range of post-angle angles of attack can be achieved relying on the concept of the so-called mild stall ramp (MS-ramp) at the aft portion of the upper surface of the main body (see for example U.S. Pat. No. 8,109,473 (ref 1 above), Nagel et al (Ref 2 above: "Development of High-Lift UAV Wings", 24$^{th}$ AIAA Applied Aerodynamics Conference, San Francisco, Ca, 5-8 Jun. 2006), and Shepshelovich (Ref 3 above: "The Progress in Development of UAV Wings", International Conference ICAUV-2009, Bangalore, India, 2009)).

Such two-element aerofoils also provide a longitudinal overlap (i.e., generally defined as an overlap in a direction generally parallel to the reference line of the aerofoil), between the trailing edge of the primary element (also referred to interchangeably herein as the trailing end of the primary element) and the leading edge of the secondary element (also referred to interchangeably herein as the leading end of the secondary element). The longitudinal overlap is positive when part of the primary element is superposed over part of the secondary element (i.e., when viewed in a direction normal to the reference line of the aerofoil, for example), and the positive direction is in a direction towards the leading edge of the aerofoil. Conversely, the longitudinal overlap is negative when there is no such superposition, and the trailing end of the primary element is longitudinally spaced away from the leading end of the secondary element (i.e., when viewed in a direction normal to the reference line of the aerofoil, for example), and the negative direction is in the direction towards the trailing edge of the aerofoil. The aforesaid "longitudinal overlap" is also referred to herein interchangeably as "overlap" or "axial overlap".

Similarly, a gap can also be defined for the two-element aerofoils, as the spacing between the trailing end of the primary element and the leading end of the secondary element in a direction generally orthogonal to the direction of the longitudinal overlap, i.e., in a direction generally orthogonal to the reference line of the aerofoil. Alternatively, the gap can be defined in a direction parallel to the thickness of the aerofoil.

Referring to FIG. 1, Abbott et al (Ref 7 above: "Theory of Wing Sections", Dover Publication, book, 1959") provides a contour map of maximum lift coefficient as a function of slot overlap and gap. The contours show that maximum lift coefficient for the NACA 23012 wing section was obtained for a longitudinal overlap of about 1% and gap of about 2%. As the longitudinal overlap is increased positively (i.e., in the positive direction, towards the aerofoil leading edge), for example to +2%, the maximum lift coefficient drops to about 2.75, and as the longitudinal overlap is increased negatively (i.e., in the negative direction, towards the aerofoil trailing edge), for example to 0%, the maximum lift coefficient again drops to about 2.75 Similar effects are observed as the gap is increased or decreased from about just under 2%.

Thus, conventionally, two-element slotted aerofoil design seeks to optimize performance by providing a positive longitudinal overlap close to zero, typically between 0° to 3° for example, for the range of flap angles δ in which maximum lift is to be maximized. For example the range of flap angle δ can be between about 25° and 30°, often required for take off and landing performance, for example, and generally in which the flow over the secondary element is fully attached. Accordingly it follows that, if the second element of such two-element slotted aerofoils is further deflected to flap angles δ associated with use as airbrake (wherein generally, the flow over the secondary element is fully detached to maximize drag, for example flap angle δ between about 60° and 80°) about a fixed hinge point, the resulting overlap becomes negative, as illustrated in FIGS. 2(a) and 2(b), for example. Concurrently, the lift coefficient drops rapidly as flap angle δ increases past about 30° and continues dropping steadily past 60° (FIG. 3).

Indeed, while conventional airbrakes for air vehicles are designed to provide high levels of drag via large deflections of the airbrakes, such high levels of drag are conventionally coupled with a significant drop in maximum lift characteristics at these high deflections. Thus, while maximum lift of high-lift devices is realized with fully attached flow on the deflected flap segments (i.e., at conventional positive flap deflections), such flap segments when used as airbrakes (i.e., at airbrake flap deflections) rely on fully separated flow on the flap segment for producing maximum possible drag for deployed airbrake ($\delta_{airbrake}$~+60° to +80°).

Such a conventional airbrake concept is described for example in Steinbuch et al (Ref 4 above: "Development of UAV Wings—Subsonic Designs", 41$^{st}$ Aerospace Sciences Meeting, Reno, Nev., 6-9 January, 2003), and was adopted in the development of the aforementioned IAI Heron UAV.

Providing a positive longitudinal overlap to maximize the maximum lift coefficient at flap angles associated with maximum lift conditions has become the conventional principle for design of high-lift devices (see, for example, the cases presented in McCormick (Ref. 5 above: "Aerodynamics Aeronautics and Flight Mechanics", John Wiley & Sons, book, 2$^{nd}$ edition, 1995). Such high-lift devices may be of single-slotted flap type, for example. Conventionally, the optimum lift performance of these devices is achieved for positive overlap, or overlap close to zero (between −1.0 and 3.0% of chord) at flap deflections associated with maximum lift and almost fully attached flow on the high lift devices, and at flap deflections not greater than about 30°.

It is to be noted that comparatively mechanically simple designs for high-lift devices, for example as provided on at least some IAI high-lift, two-element wings, rely on single-slotted flap with a fixed hinge point location. In such cases, the maximum positive conventional flap deflections with fully attached flow are around δ ~+20° to +30°, depending on the flight Reynolds numbers (for example Reynolds numbers between about 0.2*10$^6$ to about 2.0*10$^6$), providing for maximizing the maximum lift coefficient. In such cases, flap deflections above δ ~+30° require a simple continuation of the flap rotation around the fixed hinge point, when the flap segment becomes fully separated and begins to operate in airbrake mode. In such cases, this continuation of the flap rotation around the fixed hinge point to large deflections angles above δ ~30°, and including 60° to 80°, or to more than 80°, automatically results in a longitudinal overlap that rapidly increases negatively, for example −3.5% of the chord at δ ~60°.

GENERAL DESCRIPTION

The term "suction peak" refers herein to relatively fast flow acceleration at the leading edge of the aerofoil, producing a spiky pressure distribution.

The term "blunt leading edge" refers herein to increased thickness and increased local radius of the forward portion of the aerofoil that prevents formation of suction peak at high angles of attack and produces a rounded pressure distribution at the leading edge of the aerofoil.

Herein, the term "mild-stall aerofoils" (MS-aerofoils) refers to a class of wing sections aerofoils characterized by the lift curve having a plateau range of lift coefficients at post-stall angles of attack followed by gradual decline of the lift at high post-stall angles of attack. The plateau range and the gradual decline correspond to a gradually developing trailing edge separation of the flow, until total separation of the aerofoil is achieved. Accordingly, it is often possible to more or less maintain the lift generated by the wing at the level of maximum lift, or within about 10% for example, for a relatively wide range of post-stall angles of attack, the range being typically at least about 5°, 7° or 8° or greater than 8°.

Without being subject to theory, the mechanism of mild stall of high-lift aerofoils can be explained by the combination of continuous lift build-up at the forward portion of MS-aerofoils and slowly creeping trailing edge separation. The blunt or rounded leading edge of MS-aerofoils helps to produce rounded pressure distributions at the forward portion of the wing section, preventing formation of sharp suction peak at stall and post-stall angles of attack. This supports the gradual development of trailing edge separation that is initiated prior to the stall angle of attack and is controlled by the shape of aft camber.

Herein, the term "High-Lift Mild-Stall aerofoils" (HL-MS aerofoils) refers to a special class of mild stall aerofoils that, for any Reynolds number in the range of between about 0.3*10$^6$ to about 2*10$^6$, provide maximum lift $C_{l\ max}$ above the $C_{l\ max}$ for the same Reynolds number according to a minimum boundary line as defined by a linear variation between points of $C_{l\ max}$=1.6 at Re=0.3*10$^6$ and $C_{l\ max}$=1.95 at Re=2.0*10$^6$. This variation serves to differentiate HL-MS aerofoils (providing high lift) from conventional mild stall aerofoils (MS-aerofoils) with moderate maximum lift, wherein conventional mild stall aerofoils, such as for example NACA4415 and its derivatives, achieve maximum lift coefficient below this minimum boundary.

According to a first aspect of the presently disclosed subject matter there is provided a two element aerofoil, having an aerofoil chord, a primary element having a first leading edge and a first trailing edge, a secondary element having a second leading edge and a second trailing edge, a gap between the primary element and the secondary element, and an axial overlap between the first trailing edge and the second leading edge, the secondary element being deflectable with respect to the primary element about a fixed hinge point by a flap deflection angle, the secondary element being configured to operate in airbrake mode when deflected by a respective said flap deflection angle corresponding to a design airbrake deflection angle wherein to generate an airbrake drag, wherein at least for said design airbrake deflection angle said axial overlap is numerically greater than −0.5% of the aerofoil chord.

For example, the design airbrake deflection angle is greater than 40°.

Additionally or alternatively, said design airbrake deflection angle is greater than 45°.

Additionally or alternatively, said design airbrake deflection angle is greater than 55°.

Additionally or alternatively, said airbrake drag corresponds to an airbrake aerofoil drag coefficient that is at least 150% greater than a datum drag coefficient of the aerofoil at a zero said flap deflection angle. For example, said airbrake aerofoil drag coefficient is greater than 0.15. Additionally or alternatively, for example, said airbrake aerofoil drag coefficient is greater than 0.2. Additionally or alternatively, for example, said airbrake aerofoil drag coefficient is greater than 0.3.

Additionally or alternatively, the primary element is configured for providing high lift mild stall characteristics, and wherein the aerofoil is configured to generate said airbrake drag while concurrently retaining said mild stall characteristics.

Additionally or alternatively, at least for said design airbrake deflection angle said axial overlap is between −0.5% and +4% of the aerofoil chord.

Additionally or alternatively, said axial overlap provides a smooth variation of aerofoil maximum lift coefficient with said flap deflection angle for a range of said flap deflection angles at least ±10° from said design airbrake deflection angle.

Additionally or alternatively, at said axial overlap, the aerofoil maximum lift coefficient is maintained constant within 0.1 with said flap deflection angle for a range of said flap deflection angles at least ±10° from said design airbrake deflection angle.

Additionally or alternatively, a value for said axial overlap is chosen to maximize the maximum lift coefficient obtained for the aerofoil at said design airbrake deflection angle.

Additionally or alternatively, said secondary element is in the form of a slotted flap.

Additionally or alternatively, the secondary element is deflectable with respect to the primary element about said fixed hinge point to provide said flap deflection angle ranging between about −15° and +60°.

Additionally or alternatively, at said design airbrake deflection angle, at least a majority of an airflow over said secondary element is fully detached.

Additionally or alternatively, at said design airbrake deflection angle said aerofoil generates a maximum lift coefficient greater than 2.5.

Additionally or alternatively, at said design airbrake deflection angle corresponds to a design Reynolds number of between $0.3*10^6$ and $1.0*10^6$.

Additionally or alternatively, at said design airbrake deflection angle corresponds to a design Reynolds number of $0.4*10^6$.

According to the first aspect of the presently disclosed subject matter there is also provided a wing having aerofoil sections corresponding to the aerofoil as defined above with respect to the first aspect of the presently disclosed subject matter.

According to the first aspect of the presently disclosed subject matter there is also provided an air vehicle comprising wings, each said wing having aerofoil sections corresponding to the aerofoil as defined above with respect to the first aspect the presently disclosed subject matter.

According to a second aspect of the presently disclosed subject matter there is provided a two element aerofoil, having an aerofoil chord, a primary element having a first leading edge and a first trailing edge, a secondary element having a second leading edge and a second trailing edge, a gap between the primary element and the secondary element, and an axial overlap between the first trailing edge and the second leading edge, the secondary element being deflectable with respect to the primary element about a fixed hinge point by a flap deflection angle, the secondary element being configured to operate in airbrake mode when deflected by a respective said flap deflection angle corresponding to a design airbrake deflection angle wherein to generate an airbrake drag, wherein a value for said axial overlap is chosen to maximize the maximum lift coefficient obtained for the aerofoil at said design airbrake deflection angle.

For example, the design airbrake deflection angle is greater than 40°.

Additionally or alternatively, said design airbrake deflection angle is greater than 45°.

Additionally or alternatively, said design airbrake deflection angle is greater than 55°.

Additionally or alternatively, said airbrake drag corresponds to an airbrake aerofoil drag coefficient that is at least 150% greater than a datum drag coefficient of the aerofoil at a zero said flap deflection angle. For example, said airbrake aerofoil drag coefficient is greater than 0.15. Additionally or alternatively, for example, said airbrake aerofoil drag coefficient is greater than 0.2. Additionally or alternatively, for example, said airbrake aerofoil drag coefficient is greater than 0.3.

Additionally or alternatively, the primary element is configured for providing high lift mild stall characteristics, and wherein the aerofoil is configured to generate said airbrake drag while concurrently retaining said mild stall characteristics.

Additionally or alternatively, at least for said design airbrake deflection angle said axial overlap is numerically greater than −0.5% of the aerofoil chord Additionally or alternatively, at least for said design airbrake deflection angle said axial overlap is between −0.5% and +4% of the aerofoil chord.

Additionally or alternatively, said axial overlap provides a smooth variation of aerofoil maximum lift coefficient with said flap deflection angle for a range of said flap deflection angles at least ±10° from said design airbrake deflection angle.

Additionally or alternatively, at said axial overlap, the aerofoil maximum lift coefficient is maintained constant within 0.1 with said flap deflection angle for a range of said flap deflection angles at least ±10° from said design airbrake deflection angle.

Additionally or alternatively, said secondary element is in the form of a slotted flap.

Additionally or alternatively, the secondary element is deflectable with respect to the primary element about said fixed hinge point to provide said flap deflection angle ranging between about −15° and +60°.

Additionally or alternatively, at said design airbrake deflection angle, at least a majority of an airflow over said secondary element is fully detached.

Additionally or alternatively, at said design airbrake deflection angle said aerofoil generates a maximum lift coefficient greater than 2.5.

Additionally or alternatively, at said design airbrake deflection angle corresponds to a design Reynolds number of between $0.3*10^6$ and $1.0*10^6$.

Additionally or alternatively, at said design airbrake deflection angle corresponds to a design Reynolds number of $0.4*10^6$.

According to the second aspect of the presently disclosed subject matter there is also provided a wing having aerofoil sections corresponding to the aerofoil as defined above with respect to the second aspect of the presently disclosed subject matter.

According to the second aspect of the presently disclosed subject matter there is also provided an air vehicle comprising wings, each said wing having aerofoil sections corresponding to the aerofoil as defined above with respect to the second aspect the presently disclosed subject matter.

According to a third aspect of the presently disclosed subject matter there is provided a method for landing an air vehicle, the air vehicle comprising wings having aerofoil sections corresponding to the aerofoil as defined above for the first or second aspects of the presently disclosed subject matter, the method comprising maximizing glide angle by:

deflecting the secondary element to said design airbrake deflection angle to provide said airbrake drag;

reducing airspeed of the air vehicle to maximize lift.

For example, the aerofoil is configured to generate large values of drag concurrently with high lift to maintain low values of the lift-to-drag ratio (L/D), and thereby provide high values of glide angle $\gamma$.

For example, said glide angle $\gamma$ is greater than 1.5°, or greater than 5°, or greater than 12°, or greater than 15°. For example, said glide angle $\gamma$ is in the range between about 3° and about 15°. For example, said glide angle $\gamma$ is in the range between 10° and about 15°.

Additionally or alternatively, said glide angle $\gamma$ is maximized to minimize exposure time of the air vehicle during landing thereof.

Additionally or alternatively, said glide angle $\gamma$ is chosen to compensate for tall obstacles are located in the vicinity or perimeter of the landing site for the air vehicle.

Additionally or alternatively, said glide angle $\gamma$ is controllably selected during landing to provide a desired precision for the touchdown point.

Additionally or alternatively, the aerofoil is configured to provide high-lift mild stall characteristics, and wherein prior to landing the air vehicle is flown with an absence of a conventional speed safety margin.

Additionally or alternatively, the aerofoil is configured to provide high-lift mild stall characteristics, and wherein prior to landing the air vehicle is flown at post-stall angles of attack maintaining high levels of lift.

According to a fourth aspect of the presently disclosed subject matter there is provided a method for operating an air vehicle, the air vehicle comprising wings having aerofoil sections corresponding to the aerofoil as defined above for the first or second aspects of the presently disclosed subject matter, wherein the aerofoil is configured to provide high-lift mild stall characteristics, the method comprising flying the air vehicle with an absence of a conventional speed safety margin.

According to a fifth aspect of the presently disclosed subject matter there is provided a method for operating an air vehicle, the air vehicle comprising wings having aerofoil sections corresponding to the aerofoil as defined above for the first or second aspects of the presently disclosed subject matter, wherein the aerofoil is configured to provide high-lift mild stall characteristics, the method comprising flying the air vehicle at post-stall angles of attack maintaining high levels of lift.

According to a sixth aspect of the presently disclosed subject matter there is provided a method for designing a two element aerofoil, having an aerofoil chord, a primary element having a first leading edge and a first trailing edge, a secondary element having a second leading edge and a second trailing edge, a gap between the primary element and the secondary element, and an axial overlap between the first trailing edge and the second leading edge, the secondary element being deflectable with respect to the primary element about a fixed hinge point by a flap deflection angle, the secondary element being configured to operate in airbrake mode when deflected by a respective said flap deflection angle corresponding to a design airbrake deflection angle wherein to generate an airbrake drag, the method comprising:

at least for said design airbrake deflection angle, setting said axial overlap to be numerically greater than −0.5% of the aerofoil chord.

According to a seventh aspect of the presently disclosed subject matter there is provided a method for designing a two element aerofoil, having an aerofoil chord, a primary element having a first leading edge and a first trailing edge, a secondary element having a second leading edge and a second trailing edge, a gap between the primary element and the secondary element, and an axial overlap between the first trailing edge and the second leading edge, the secondary element being deflectable with respect to the primary element about a fixed hinge point by a flap deflection angle, the secondary element being configured to operate in airbrake mode when deflected by a respective said flap deflection angle corresponding to a design airbrake deflection angle wherein to generate an airbrake drag, the method comprising:

defining a value for said axial overlap such as to maximize the maximum lift coefficient obtained for the aerofoil at said design airbrake deflection angle.

BRIEF DESCRIPTION OF THE DRAWINGS

In order to better understand the subject matter that is disclosed herein and to exemplify how it can be carried out in practice, examples will now be described, by way of non-limiting example only, with reference to the accompanying drawings, in which:

FIG. 1 illustrates contours of flap location for maximum lift coefficient provided with a slotted flap on a NACA 23012 wing section.

FIG. 2(a) and FIG. 2(b) illustrate the effect of flap rotation on axial overlap for a baseline aerofoil SA-21. In FIG. 2(a) the flap rotation is +25° (conventional flap deflection) and the axial overlap is +2%; in FIG. 2(b) the flap rotation is +60° (large flap deflection) and the axial overlap is −3.5%

FIG. 6(a) cruise/loitering, flap deflection 0°; FIG. 6(b) take-off/landing, flap deflection +25°; FIG. 6(c) ailerons, flap deflection ±25°; FIG. 6(d) decambering, flap deflection −15°; FIG. 6(e) airbrake, flap deflection +60°.

FIGS. 7(a) to 7(c) illustrate the axial overlap obtained with the aerofoil of FIG. 5 corresponding to flap deflections of 0° (nominal flap setting), +25° (maximum conventional flap deflection), +60° (deployed airbrake), respectively.

FIGS. 8(a) and 8(b) illustrate, at Reynolds numbers of 0.3*10⁶ and 0.5*10⁶, respectively, lift coefficient variations with angle of attack obtained with the aerofoil of FIG. 5 corresponding to conventional positive flap deflections of 0°, +10°, +20°.

FIGS. 9(a) to 9(d) illustrate pressure distributions obtained in wind tunnel tests with the aerofoil of FIG. 5 at a number of post-stall angles of attack, corresponding to flap deflection of 0° and Reynolds numbers of 0.3*10⁶.

FIGS. 12(a) and 12(b) illustrate hysteresis effect on lift coefficient variations with angle of attack obtained in wind tunnel tests with the aerofoil of FIG. 5 at flap deflection of +20° and Reynolds numbers of 0.3*10⁶.

FIG. 13 compares lift coefficient variations with angle of attack obtained in wind tunnel tests with the aerofoil of FIG. 5 at flap deflection of 0° and at flap deflection of +60°, at Reynolds numbers of 0.3*10⁶.

FIGS. 14(a) to 14(d) illustrate pressure distributions obtained in wind tunnel tests with the aerofoil of FIG. 5 at a number of post-stall angles of attack, corresponding to flap deflection of +60° and Reynolds numbers of 0.3*10⁶.

FIG. 17(a) illustrates at Reynolds numbers of 0.5*10⁶, lift coefficient variations with angle of attack obtained with the aerofoil of FIG. 5 corresponding to conventional flap deflections of 0°, +10°, +20°; FIG. 17(b) illustrates drag coefficient variations with flap angle obtained with the aerofoil of FIG. 5.

FIGS. 21(a) to 21(d) illustrate variations with time of angle or attack, glide angle, velocity, and rate of descent (ROD), respectively, at conditions of flap deflection angle +20°, elevator deflection angle −12° and engine idle, obtained with flight test of the UAV AK-60, at approach to landing at post-stall.

FIGS. 22(a) to 22(d) illustrate variations with time of angle or attack, glide angle, velocity, and rate of descent (ROD), respectively, at conditions of flap deflection angle +60°, elevator deflection angle −12° and engine idle, obtained with flight test of the UAV AK-60, at approach to landing at post-stall.

FIG. 23 schematically illustrates the wing lift coefficient variation with angle of attack for the UAV AK-60.

FIG. 24 illustrates variations of lift coefficient and drag coefficient with flap deflection angle obtained in two-dimensional wind tunnel testing of aerofoil SA-MS/17MLS.

NOMENCLATURE

Figure 3:
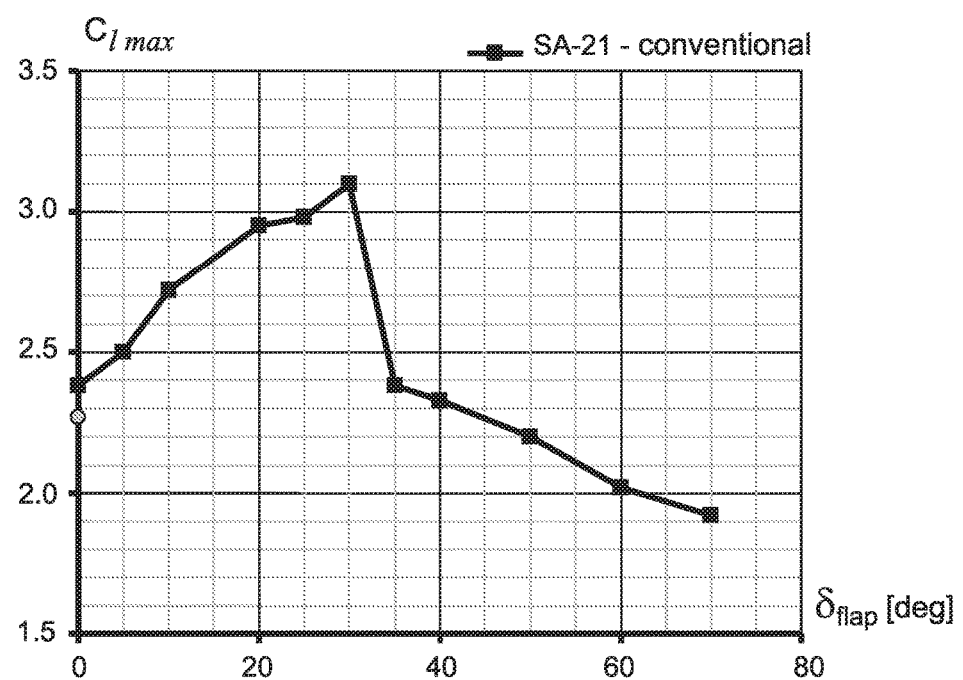
FIG. 3 illustrates the variation of maximum lift coefficient with flap angle for baseline aerofoil SA-21, and the discontinuous change in the variation at flap angle of about 30° to 35°.

| | | | |
|---|---|---|---|
| $C_L^{1.5}/C_D$ | aircraft endurance factor | $\alpha$ | angle of attack |
| $C_L$ | aircraft lift coefficient | $\delta_{ail}$ | aileron deflection |
| $C_d$ | aerofoil drag coefficient | $\delta$ | flap deflection |
| $C_l$ | aerofoil lift coefficient | $C_L$max | wing maximum lift |
| $C_l$max | aerofoil maximum lift | AR | aspect ratio |
| $C_m$ | aerofoil pitching moment | CFD | computational fluid dynamics |
| $C_p$ | pressure coefficient | IAI | Israel Aircraft Industries |
| $C_{Do}$ | zero lift drag | NLF | natural laminar flow |
| e | spanload efficiency | MS | mild stall |
| Re | Reynolds number | SA | slotted aerofoil |
| t/c | thickness ratio | UAV | unmanned air vehicle |
| x/c | chord fraction | W | Weight |

DETAILED DESCRIPTION

According to a first example of the presently disclosed subject matter, high lift wings are provided for an aircraft, in particular a fixed wing aircraft. For the purpose of example, and referring to FIG. 4, such an air vehicle or aircraft is described herein as a fixed-wing aircraft, generally designated with reference numeral 1, comprising a regular subsonic/transonic configuration, having a fuselage section 2, main wings 10 (only the starboard wing (also referred to herein as a "wing half") is illustrated in this figure), tailplane 3, vertical stabilizer 4, and a propulsion system (not shown). However, the presently disclosed subject matter is also applicable, mutatis mutandis, to other types of aircraft, for example: gliders; subsonic/transonic aircraft having canards rather than a tailplane; general aviation aircraft, cruise missiles or other air delivered ordinance, and so on. Furthermore, while the presently disclosed subject matter finds particular application in UAV aircraft, the presently disclosed subject matter can also be applied to manned aircraft, mutatis mutandis, in particular to general aviation, sailplanes, subsonic transport, naval aviation, guided or other weapons, and so on, for example.

Figure 4:
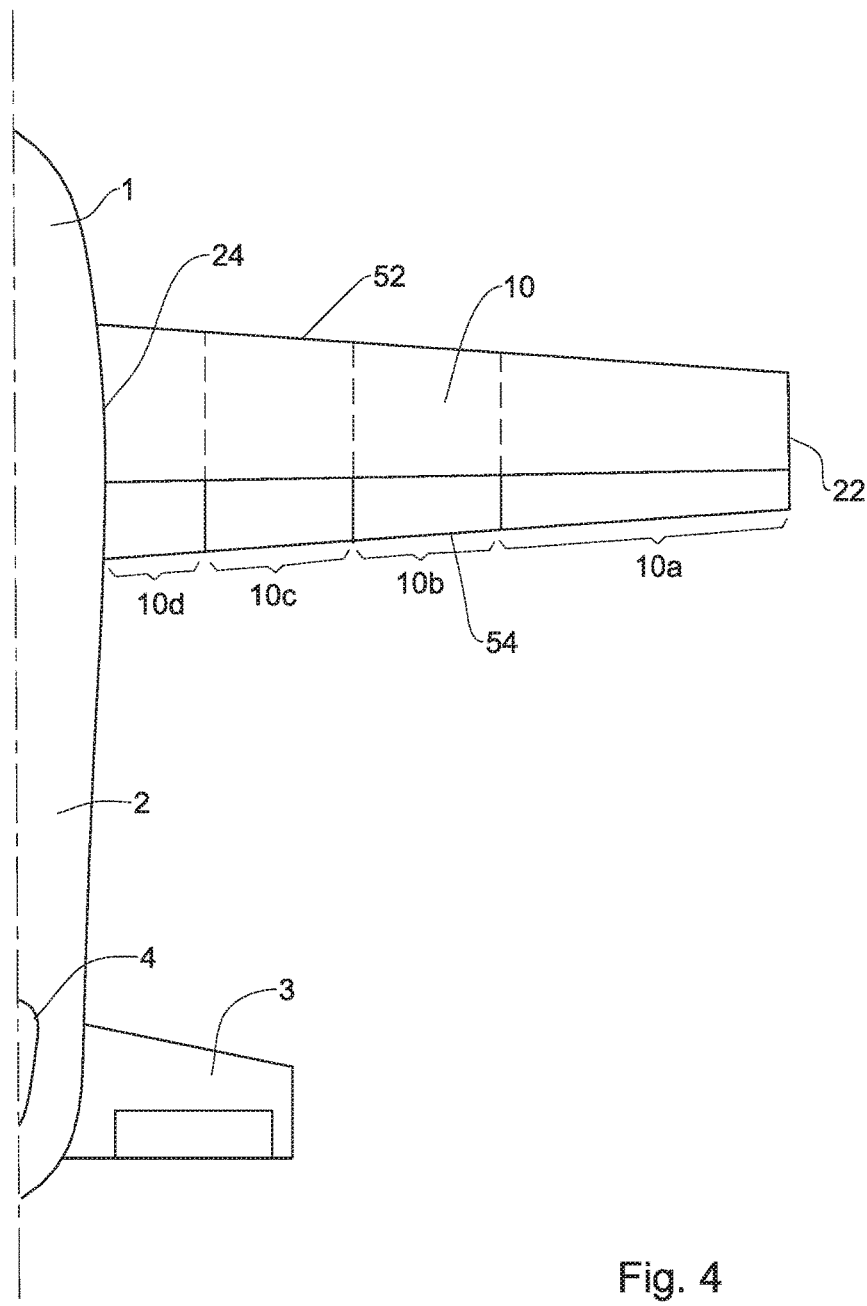
FIG. 4 illustrates in plan view an air vehicle comprising wings based at least in part on two-element aerofoils according to at least one example of the presently disclosed subject matter.

In the illustrated example of FIG. 4, and by way of non-limiting example, the wing has a substantially trapezoidal plan shape, the leading edge 52 of the wing 10 being substantially rectilinear and having a substantially zero sweep angle, and the wing having a taper of between about 0.6 to about 1.0, between the root 24 and the tip 22. The trailing edge 54 of the wing 10 is also substantially rectilinear and comprises a substantially negative sweep angle. In other variations of this example, the wing 10 can have a different plan form, for example: swept-back or swept forward, and/or with a different taper ratio (along the full wing, or different taper ratios for the inboard section and the outboard section), for example a zero taper ratio along the span of the wing 10; and/or having a different plan form, including curved leading edges and/or trailing edges such as an elliptical form, for example; and/or the inboard section and/or the outboard section can have a positive, negative or zero dihedral angle; and so on.

Figure 5:
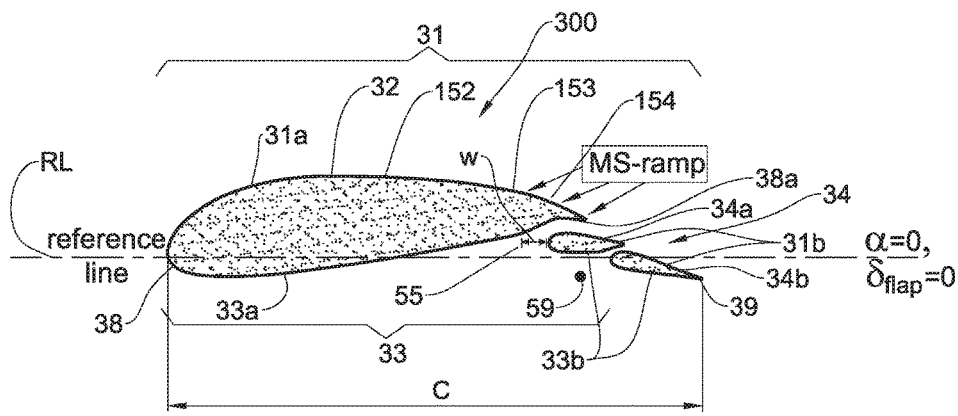
FIG. 5 illustrates a two-element aerofoil according to one example of the presently disclosed subject matter.
Figure 6A:
FIGS. 6(a) to 6(e) illustrate various modes of operation of the aerofoil of FIG. 5 corresponding to respective flap deflections.
Figure 6B:
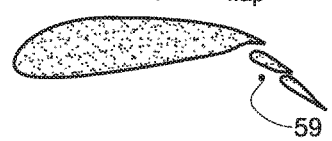
Figure 6C:
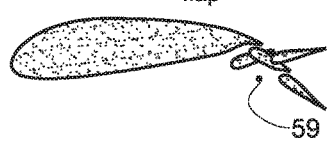
Figure 6D:
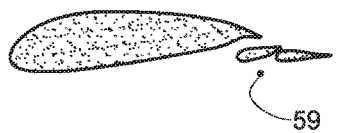
Figure 6E:
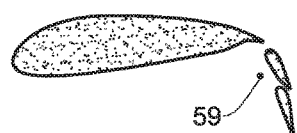
Figures 10A, 10B:
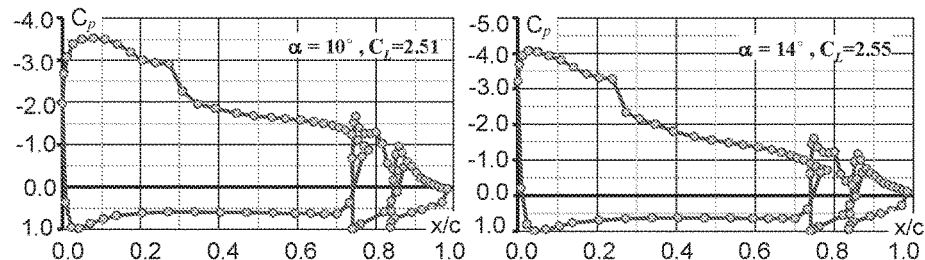
FIGS. 10(a) to 10(d) illustrate pressure distributions obtained in wind tunnel tests with the aerofoil of FIG. 5 at a number of post-stall angles of attack, corresponding to flap deflection of +20° and Reynolds numbers of 0.3*10⁶.
Figures 10C, 10D:
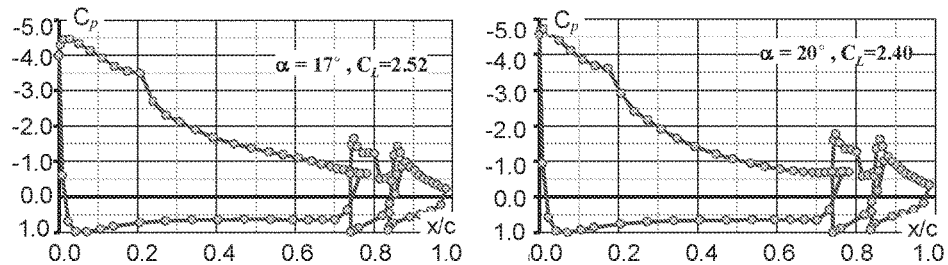
Figure 11A:
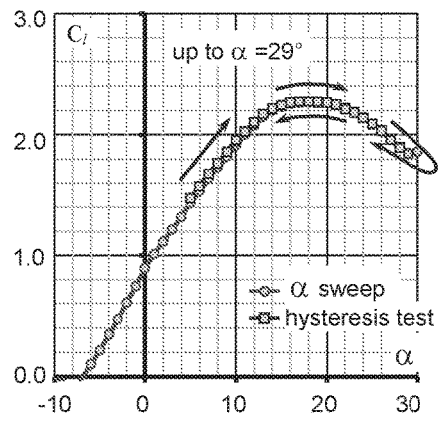
FIGS. 11(a) and 11(b) illustrate hysteresis effect on lift coefficient variations with angle of attack obtained in wind tunnel tests with the aerofoil of FIG. 5 at flap deflection of 0° and Reynolds numbers of 0.3*10⁶.
Figure 11B:
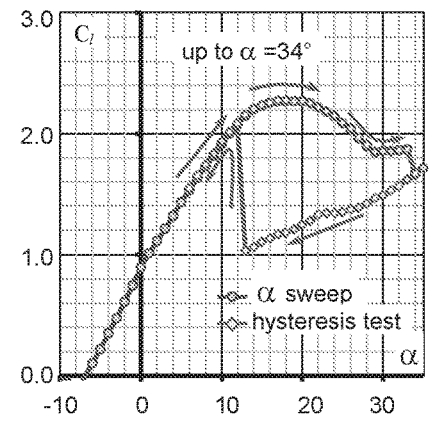

Referring also to FIG. 5, the wing 10 is based on (i.e., the wing 10 comprises a plurality of aerofoil sections each corresponding to) a two-element mild stall slotted aerofoil 300, also interchangeably referred to herein as SA-MS aerofoil or SA-MS aerofoil 300, in particular exhibiting high lift mild stall characteristics Aerofoil 300 comprises a first or primary element 32 (also referred to interchangeably herein as the "main body of the aerofoil", or as the "main body"), and a pivotable second or secondary element 34 (also referred to interchangeably herein as the "flap" of the aerofoil, or as the flap). The primary element 32 comprises the leading edge 38 of the aerofoil, which coincides with the leading edge 52 of the wing 10, and major portions 31*a*, 33*a*, of the suction surface 31 and pressure surface 33 thereof, respectively, and a trailing end 38*a*, also referred to interchangeably herein as the trailing edge of the primary element 32. The secondary element 34 comprises the trailing edge 39 of the aerofoil, which coincides with the trailing edge 54 of the wing 10, and minor portion 31*b*, 33*b*, of the suction surface 31 and pressure surface 33 thereof, respectively. A slot 55 separates the leading end 35 of the secondary element 34 (also referred to interchangeably herein as the leading edge of the secondary element 34) from the trailing end 38*a* of the primary element 32. For example, the slot 55 can have an axial width w at least 2% of the aerofoil chord C in a non-deflected position of the flap element.

Reference line RL is a datum line conventionally defined with respect to the aerofoil 300, and the angle of attack a of the aerofoil 300, and deflection angle δ of the secondary element 34, are defined with respect to this datum line. The deflection angle δ is also referred to interchangeably herein as flap deflection angle δ or as flap angle δ.

The precise form of the slot 55 can generally vary with deflection angle δ of the secondary element 34, and thus generally depends on the particular mode of operation of the wing 10, as illustrated, for example, in FIGS. 6(*a*) to 6(*e*) which refer to cruise/loiter mode (deflection angle δ=0°), take-off/landing mode (deflection angle δ=+25°), aileron mode (deflection angle δ=±25°), maximum speed decambering mode (negative flap deflection, deflection angle δ=−15°), and airbrake mode (deflection angle δ=+60°), respectively.

The hinge point 59 of the secondary element 34 is fixed at an outwardly displaced position with respect to the lower (pressure) surface of the secondary element 34. The airflow through slot 55 provides enhanced efficiency and linearity of the aerodynamic characteristics of the aerofoil as compared to a similar non-slotted aerofoil. A suitable actuation mechanism (not shown) is provided for actuating the secondary element 34 to adopt the range of deflection angles desired, including airbrake mode deflection angles.

In this example, the secondary element 34 is formed as a slotted flap segment, having a slotted flap construction, comprising sub-elements 34*a* and 34*b*, rigidly connected to one another and separated by minor slot 37, such that the secondary element 34 rotates about hinge point 59 as a rigid body. The slotted flap construction is configured for facilitating providing smooth lift characteristics at post-stall angles of attack at intermediate positive flap deflections with deflection angles δ of about 15° to about 25°. In alternative variations of this example, the secondary element 34 is formed as a single continuous flap segment, without the minor slot.

Referring to FIGS. 7(*a*) to 7(*c*), the secondary element 34 is spatially positioned with respect to the primary element 32 to provide a characteristic relationship between the longitudinal overlap M (between primary element 32 and the secondary element 34), and the deflection angle δ of the secondary element 34 with respect to the primary element 32. According to this characteristic relationship, the longitudinal overlap M is unconventionally chosen to maximize the maximum lift coefficient that is obtained at deflection angles δ that are significantly larger than the deflection angle δ associated with maximum lift of the aerofoil, and in particular at deflection angles δ associated with airbrake mode of the aerofoil.

In airbrake mode, the secondary element 34 is deflected by a respective flap deflection angle corresponding to a design airbrake deflection angle wherein to generate an airbrake drag. Thus, in airbrake mode, the flap angle δ is large, and generates significantly more drag than at flap angles associated with maximum lift coefficient of the aerofoil in which flow on the flap segment is attached or almost attached (while concurrently the maximum lift coefficient can remain almost constant). In particular, and as illustrated in FIG. 17(*b*), for example, in airbrake mode the flap angle δ can be more than 40°, or more than 50°, or more than 55°, or 60° or more than 60°. In each case, the respective drag coefficient is at least 150% of the value at flap angle δ of 30°, and the respective drag coefficient at these airbrake mode flap deflection angles δ can be greater than 0.15, or greater than 0.2, or greater than 0.3, for example. In particular, and as illustrated in FIGS. 14(*a*) to 14(*d*), for example, in airbrake mode the flow over the secondary element is fully detached.

The longitudinal overlap M thus chosen retains a high maximum lift for the aerofoil 300. Furthermore, and as will become clearer below, and the longitudinal overlap M thus chosen also allows the aerofoil 300 to produce mild stall characteristics. In turn, this allows for the integration of the secondary element 34 as an airbrake with a mild stall wing 10 and for flight of the aircraft 1 at post stall angles of attack, thereby retaining the plateau of high lift coefficient (associated with mild stall) with the secondary element 34 deployed as an airbrake.

Thus, and referring to FIGS. 7(*b*) and 7(*c*), at maximum conventional flap deflections associated with maximizing lift, with a deflection angle δ of about 25° for example, the longitudinal overlap M is about +4% of the chord, whereas at a deflection angle δ of about 60°, for example, associated with airbrake mode, the longitudinal overlap M is about −0.5% of the chord. These values of +4% and −0.5% for the longitudinal overlap M contrast with the corresponding longitudinal overlap values of +2% and −3.5%, respectively, obtained with the conventional aerofoil arrangement of FIGS. 2(*a*) and 2(*b*).

Thus, according to the aforesaid characteristic relationship, the longitudinal overlap M is unconventionally chosen to be larger, for example 1% or 2% or 3% or more than 3% of the chord larger, at any given flap angle, than would be the case if the longitudinal overlap M were conventionally chosen. Thus, for example, the longitudinal overlap M can be optimized to be within the range +2% to −0.5% (or to be within the range +1% to −0.5%) at deflection angles δ wherein the flap operates as an air brake—for example at airbrake deflection angle δ of 45° or more, or at airbrake deflection angle δ of 50° or more, or at airbrake deflection angle δ of 55° or more, or at airbrake deflection angle δ of 60° or more, or at airbrake deflection angle δ of 65° or more, or at airbrake deflection angle δ of 70° or more, or at airbrake deflection angle δ of 75° or more, or at airbrake deflection angle δ of 80° or more.

The numerical value for the flap angle δ and the longitudinal overlap M can be chosen to provide the desired level of drag (see FIG. 17(*b*)) and desired maximum lift coefficient and post stall lift characteristics.

In this example, the gap N between primary element 32 and the secondary element 34 can be set in a conventional manner, for example as set forth in FIG. 1, and for example kept at between about 1% and about 2% of the chord.

In this example, the location of the hinge point 59 is chosen to provide the desired longitudinal overlap M (and optionally also the desired gap N) as a function of the flap angle δ, and further, minimizes hinge moments, optimizes flap stability (providing the flap neutral point downstream of the hinge point 59), and complies with the conventional requirements of flap actuator failure case.

In alternative variations of this example, the secondary element 34 can comprise control surfaces such as ailerons, flaps and so on, that are pivotable with respect to the secondary element 34.

Referring again to FIG. 4, the wing half 10 can optionally comprise a number of span-wise wing sections, for example serially adjoining sections 10a, 10b, 10c and 10d, between the tip 22 and root 24, in which one or more wing section the secondary element 34 is configured to perform as an air brake, while in one or more other wing section the secondary element 34 can be configured as a rigid non-movable element, or to operate within a narrower flap angle range, for example up to 30° only, thereby not operating as an airbrake, for example. For example, section 10a is configured with an aileron.

By way of non-limiting example, and referring again to FIGS. 5 and 6(a) to 6(e), such an aerofoil design for aerofoil 300 can include any suitable thickness-to-chord ratio (t/c)$_{max}$, camber distribution, and thickness distribution. Optionally, the leading edge 38 of the aerofoil 300 can also be relatively blunt or rounded, having a low curvature leading edge radius, and aft portion of the aerofoil can also be cambered.

In this example, the aerofoil 300 further comprises a highly cambered aft portion of primary element 32, this aft portion being referred to herein as a mild-stall ramp section, or MS-ramp 154. The profile of the MS ramp 154 is shaped for a particular design Reynolds number, such as to produce a slowly creeping trailing edge separation at post-stall angles of attack. The MS ramp 154 is configured for initiating mildly separated flow at stall angles of attack, for example at about 10°. The separated region on the MS-ramp 154 at post stall angles of attack, for example at 15°, continues to grow slowly, but does not induce full separation over the primary element 32 of the two-element aerofoil 300, and enables a relatively high level of lift to be maintained at the post-stall angles of attack.

Without being bound to theory, inventors consider that when the secondary element 34 is deflected at flap angle δ corresponding to airbrake mode, the flow over the secondary element 34 is fully separated at all angles of attack, at least in the range of between 16° and 24°, and is the source of high parasitic drag. At the same time, there is a slow upstream progress of the separation region of the flow over the major portions 31a of the suction surface 31 (of primary element 32) with increasing angle of attack, which accounts for the high lift mild stall characteristics of the aerofoil 300 even at airbrake mode.

Controllable development of the separated region on the MS-ramp 154, together with rounded pressure distributions at the leading edge 38, which can be obtained with a relatively blunt or rounded leading edge, having a low curvature leading edge radius, provide mild stall characteristics at the level of lift that is generally generated with high-lift, two-element aerofoils.

The upper suction surface 31 of the SA-MS aerofoil section, in particular the said MS ramp 154, includes portions of the downstream suction surface having a local curvature ($1/r_{local}$) that can increase, and/or that can remain substantially constant, i.e., where the local curvature does not substantially decrease, along the chord towards the trailing portion 38a of the primary element 32, beginning at an intermediate portion of the suction surface 31a thereof.

The MS-ramp 154 is downstream of an upstream portion 152 of suction surface 31a, in which the local curvature is reducing along the chord length. The rate of change of curvature along the suction surface 31 from the leading edge 38 to trailing portion 38a can be positive in some variations of this example, or zero in other variations of this example.

Optionally, the point 153 on the suction surface 31a along the chord at which the curvature stops decreasing, i.e., the transition between portions 152 and 154, can be located at any suitable location. For example, point 153 can be at any point between 15% and 25%, or at 30%, or at 40%, or at 45%, or at 50%, or at any point between about 30% and about 50%, or greater than 50% of the local chord (i.e., the chord of the primary element 32). Further optionally, the local curvature can be constant or increasing up to about 80%, 90%, 95% or more of the local chord.

Aerodynamically, the aerofoil 300 maintains a stall plateau for angle of attack range of at least 7° where the lift coefficient $C_l$ is within up to about 5% of maximum $C_l$.

According to some aspects of the presently disclosed subject matter, the MS ramp 154 can have a geometry that is dependent on the design Reynolds number for the aerofoil. For example, and without being bound to theory, inventors consider that the higher the design Reynolds number, the larger the local curvature of the MS-ramp 154 and the larger the longitudinal extent of the MS-ramp 154 over the major portions 31a of the suction surface 31 (of primary element 32), and conversely, the lower the design Reynolds number, the lower the local curvature of the MS ramp and the lower the longitudinal extent of the MS-ramp 154 over the major portions 31a of the suction surface 31 (of primary element 32). It is to be noted that the larger curvature MS-ramp that can be provided for a high design Reynolds number, also results in mild stall when the flow conditions are consistent with low Reynolds number, but at an additional drag penalty. By way of example, the design Reynolds number for a two element aerofoil can be between about $0.3*10^6$ to about $2.0*10^6$.

By way of non-limiting example, the aerofoil 300 comprises an 17% thickness ratio, and has $Re_{design}=0.4*10^6$, and a particular geometry of such an aerofoil, corresponding to the geometry of the aerofoil 300 illustrated in FIG. 5, is particularly denoted herein as aerofoil SA-MS/17MLS.

Wind tunnel results obtained with a two-dimensional model of a zero-swept wing section, having a uniform cross-section along the span corresponding to aerofoil SA-MS/17MLS (corresponding to aerofoil 300), are shown in FIGS. 8(a) to 17(b).

Lift curves obtained for the aerofoil SA-MS/17MLS, at nominal flap setting ($δ_{flap}=0°$) and for conventional positive flap deflections of $δ_{flap}=10°$ and of $δ_{flap}=20°$ are shown in FIGS. 8(a) and 8(b), for Reynolds numbers of $0.3*10^6$ and $0.5*10^6$ respectively. These results indicate an extended range of plateau lift coefficients at post-stall angles of attack, at Reynolds numbers of $0.3*10^6$ and $0.5*10^6$. There is also a very gradual loss of lift at high post-stall angles of attack, as the flap deflections increase from δ=0° to δ=20°.

FIGS. 9(a) to 9(d) and FIGS. 10(a) to 10(d) show pressure distributions over the aerofoil SA-MS/17MLS (corresponding to aerofoil 300), at various post-stall angles of attack, and indicate a slow development of separation region on the respective MS-ramp of the aerofoil for flap deflections δ=0 and δ=+20°. Without being bound to theory, it is considered that rounded pressure distributions at the forward portion of the aerofoil prevent premature development of suction peak and delay a fast progress of separation at higher angles of attack; eventually, development of suction peak at high angles of attack accelerates the separation process at the aft portion of the main body, producing a very gradual loss of lift with increasing angles of attack.

Referring to FIGS. 11(a) to 11(b), and FIGS. 12(a) to 12(b), aerofoil SA-MS/17MLS (corresponding to aerofoil 300) does not show signs of hysteresis phenomena up to very high post-stall angles of attack, greater than about 32°. These results were obtained from a series of specially performed hysteresis test for aerofoil SA-MS/17MLS at zero flap deflection (δ=0°) and for flap deflection of δ=+20°. At angles of attack of up to at least 29°, the lift coefficient obtained with aerofoil SA-MS/17MLS (corresponding to aerofoil 300) is not sensitive to the direction in which the angle of attack is changing. In other words, increasing the angle of attack to about 30°, and then decreasing the angle of attack provides the same variation of lift coefficients with angle of attack. However, at an angle of attack of about 34°, there is a change, and lower lift coefficients are obtained at angles of attack between 34° and about 12° as the angle of attack is reduced, as compared with the corresponding lift coefficients obtained at similar angles of attack but as the angle of attack is increased. The hysteresis behavior thus appears to start at the relatively large angle of attack of about 34°, and this allows safe operation of the air vehicle at high post-stall angles of attack up to a little under 34°, for example up to 32° or 33°. In practical terms, for UAV's or other aircraft, this corresponds to effectively eliminating hysteresis phenomena up to relatively high post stall angles of attack.

Lift curve obtained with aerofoil SA-MS/17MLS (corresponding to aerofoil 300) in airbrake mode, with a flap deflection of δ=+60° is compared with the corresponding lift curve at zero flap deflection (δ=0°) in FIG. 13. These results clearly show acceptable mild-stall characteristics at post-stall angles of attack at the large flap deflections associated with airbrake mode.

FIGS. 14(a) to 14(d) illustrate pressure distributions obtained over aerofoil SA-MS/17MLS at various post-stall angles of attack, with the secondary element deployed in airbrake mode at flap deflection of δ=+60°. These figures show development of separated region over the major portions 31a of the suction surface 31 (of primary element 32) at post stall angles of attack, while the flow over the secondary element 34 is fully separated at the high flap deflection angles of airbrake mode. Comparison of FIGS. 14(a) to 14(d) with FIGS. 10(a) to 10(d) shows that there are no significant losses of maximum lift relative to the case of flap deflection at δ=+20° for the same aerofoil, allowing safe flight of the aircraft at post-stall angles of attack with deployed airbrake for aerofoil SA-MS/17MLS (corresponding to aerofoil 300).

The above results indicate that the design of aerofoil SA-MS/17-MLS (corresponding to aerofoil 300), including the airbrake mode thereof, is suitable for integration with high-lift, mild-stall wing, allowing safe operation of an air vehicle, such as for example a UAV, at post-stall angles of attack and as will become clearer below also allows for providing relatively steep glides angles at approach to landing at reduced airspeeds.

The geometry of aerofoil SA-MS/17MLS (corresponding to aerofoil 300) can be compared with the geometry of a conventional baseline slotted aerofoil of the same thickness ratio, and denoted herein as aerofoil SA-21, illustrated in FIGS. 2(a) and 2(b), and while otherwise being similar to aerofoil SA-MS/17MLS, the baseline aerofoil SA-21 does not comprise an MS ramp (nor is configured to provide mild stall characteristics), and includes a conventional longitudinal overlap and a conventional gap, based on conventional optimization characterized by FIG. 1. Thus, conventional flap deflection angle δ of +25° associated with maximum lift, the axial overlap is about 2% of the aerofoil chord, while at large flap deflections associated with airbrake mode, for example deflection angle δ of +60°, the axial overlap is highly negative—about −3.5%. The variation of maximum lift coefficient with flap angle for the baseline aerofoil SA-21 is illustrated in FIG. 3.

Figure 15:
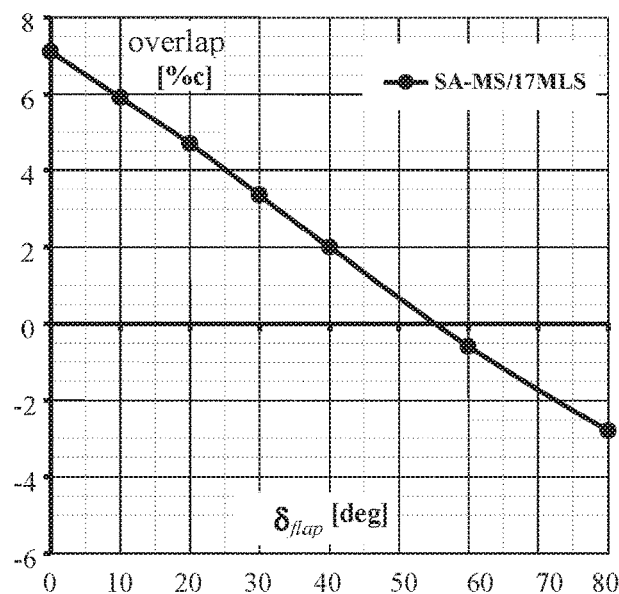
FIG. 15 illustrates axial overlap variation with flap deflection angle, obtained with the aerofoil of FIG. 5.

FIG. 15 shows the geometrical variation of longitudinal overlap with deflection angle δ, for a range of deflection angle δ from 0° to 80°, obtained for aerofoil SA-MS/17MLS (corresponding to aerofoil 300). While not shown, the longitudinal overlap provided by aerofoil SA-MS/17MLS is greater than that of baseline aerofoil SA-21 by about 2% of the chord, for a range of deflection angle δ from 0° to 40°, thereafter this difference increasing to with deflection angle δ to about 3% of the chord at deflection angle δ of 80°.

Figure 16:
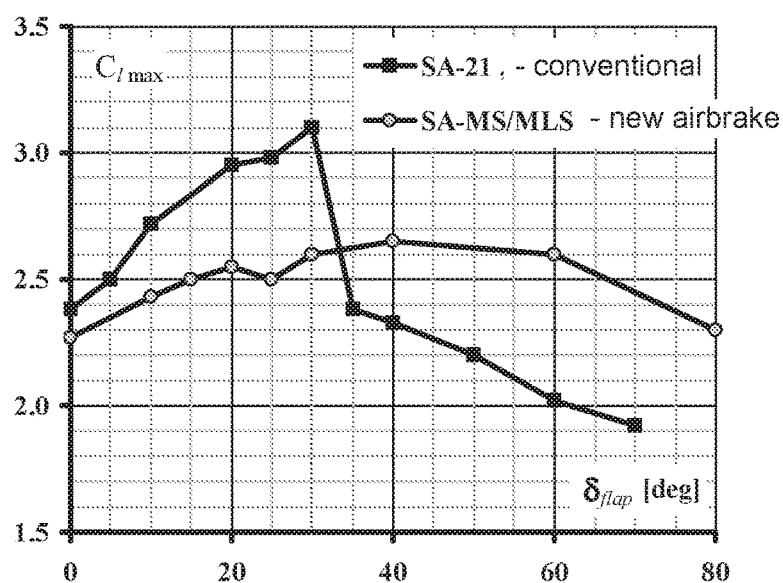
FIG. 16 compares maximum lift coefficient variation with flap deflection angle, obtained with the aerofoil of FIG. 5 and obtained with baseline aerofoil SA-21.

FIG. 16 compares the variation of maximum lift coefficient $C_{lmax}$ with deflection angle δ, for a range of deflection angle δ from 0° to 80°, obtained for aerofoil SA-MS/17MLS (corresponding to aerofoil 300). This figure further compares this variation, with the corresponding variation of maximum lift coefficient $C_{lmax}$ with deflection angle δ, obtained for baseline aerofoil SA-21.

Thus, while the conventional design baseline aerofoil SA-21 shows an abrupt loss of maximum lift coefficient for flap deflections above $\delta_{flap}$~30°, the aerofoil SA-MS/17MLS (corresponding to aerofoil 300) provides a generally constant maximum lift variation (within a band of lift coefficient $C_l$ between about 2.3 and about 2.55, i.e., a variation of about ±5% or ±6% of the mean value of maximum lift coefficient) with deflection angle δ, even at large flap deflections of 60° or 80°.

The inventors consider that the concept of providing longitudinal overlap according to the presently disclosed subject matter is particularly suitable for integration with high-lift, mild-stall wings, which are configured for providing mild stall characteristics i.e., a plateau of lift coefficients at extended range of post-stall angles of attack.

Without being bound to theory, the inventors further consider that this feature of generally constant maximum lift variation with flap deflection angle, results from providing the aforesaid longitudinal overlap optimized at the large deflection angles associated with airbrake mode, which is a radical departure from conventional design principles that require small positive overlap at $\delta_{flap}$=25° to 30° for the design of single slotted flap.

It is to be noted that for conventional airbrake designs, for example the baseline aerofoil of FIGS. 2(a) and 2(b), the loss of maximum lift when the airbrake is deployed is of minor importance. This is because, conventionally, there is also imposed a speed safety margin constraint on the operation of the air vehicle, in which the speed of the air vehicle has to exceed the stall speed by at least 20%. i.e., $V_{flight}$>1.2 $V_{stall}$ (and a corresponding lift coefficient safety margin constraint on the operation of the air vehicle, in which the lift coefficient of the wings of the air vehicle has to remain below the maximum lift coefficient by a factor of 1/1.44 (or must remain at under 70% of the maximum lift coefficient), i.e., $C_{L\,flight}$<$C_{Lmax}$/11.44. However, according to aspects of the presently disclosed subject matter, the high-lift mild stall characteristics of the aerofoils allow elimination of this speed safety margin and support safe flight of the aircraft at post-stall angles of attack maintaining high levels of lift.

It is to be noted that in alternative variations of this example, the respective aerofoil is not configured for providing high lift mild stall characteristics or for providing mild stall characteristics, though the respective aerofoil is otherwise configured as a two element slotted aerofoil, mutatis mutandis. The respective secondary element of such an aerofoil, pivotable about a fixed hinge joint and having a longitudinal overlap and gap as disclosed herein for aerofoil 300 will also enable the respective secondary element to operate in airbrake mode, and without being bound to theory inventors consider that such a configuration can help in moderating stall characteristics at high flap deflection angles corresponding to airbrake mode.

Experimental lift curves with angle of attack, obtained with aerofoil SA-MS/17MLS (corresponding to aerofoil 300) at flap deflections of $\delta_{flap}=0°$, $\delta_{flap}=+10°$ and $\delta_{flap}=+25°$, are shown in FIG. 17(a), illustrating the achieved level of smooth plateau of lift coefficients at extended range of post-stall angles of attack.

Thus, the combination of providing longitudinal overlap according to the presently disclosed subject matter with high-lift, mild-stall two-element aerofoils retains mild-stall characteristics at extended range of post-stall angles of attack and at all flap deflections at least up to $\delta_{flap}=+80°$. At the same time, the secondary element of the aerofoil provides a very high level of parasitic drag when in airbrake mode, as illustrated in FIG. 17(b), allowing approach to landing of an aircraft, for example a UAV, at reduced airspeeds at post-stall angles of attack with increased glide angles. This is not generally possible for high-lift, mild-stall wing with a conventional airbrake design because of the loss of lift at high deflection angles, and the resulting inability to provide safe flight at post-stall angles of attack.

According to another aspect of the presently disclosed subject matter, the slotted aerofoil including longitudinal overlap according to the presently disclosed subject matter provides a particularly efficient airbrake for operation at approach to landing.

A simplified definition of glide angle γ is provided by the following equation:

$$\gamma=1/(L/D) \quad (A)$$

Figure 18:
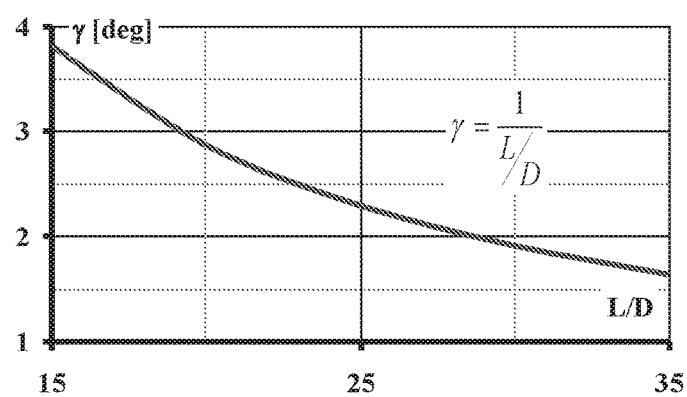
FIG. 18 illustrates a simplified estimation of glide angle with Lift/Drag ratio.

(i.e., glide angle γ=D/L)
 . . . where L is the lift force and D is the drag force acting on the air vehicle at approach to landing. FIG. 18 illustrates the variation of glide angle γ with lift-to-drag ratio (L/D). Thus, high values of glide angle γ are obtained for low values of the lift-to-drag ratio (L/D). However, large lift is usually desired at landing in order to provide a low landing speed, which would result in low values of glide angle γ.

For example, high values of glide angle γ can be provided in airbrake mode, for example in the range of between 3° to about 15°, for example in the range of between 10° to about 15°, for example 10°, or 11° or 12° or 13° or 14° or 15° or greater than 15°, with corresponding flap angles. For example glide angle γ can be provided in the range 10° to 15°, for example glide angle γ can be 10°, or 11° or 12° or 13° or 14° or 15°, and correspond to a flap deflection angle δ of about +60°, for example, in airbrake mode.

Maximizing glide angle γ can minimize exposure time of the air vehicle during landing. This can be of particular use in maritime applications, for example, wherein exposure to gusts etc. can be minimized when landing on a sea platform, particularly on rough seas. The ability to provide large glide angles γ can also be useful where tall obstacles are located in the vicinity or perimeter of the landing site for example.

The capability to controllably provide a wide range of glide angles, particularly during the actual landing, also allows for precision of touch down point of the air vehicle.

According to an aspect of the presently disclosed subject matter, the aerofoil 300 is configured to generate large values of drag concurrently with high lift (which provides low landing velocity)—the high drag thus compensates for the increased lift at landing, to maintain low values of the lift-to-drag ratio (L/D), and thus provide high values of glide angle γ.

Experimental Results with Wing Technology Demonstrator

A UAV, designated AK-60, was developed by the present assignee as a fully instrumented Wing Technology Flight Demonstrator, with the specific purpose to evaluate in-flight high-lift, mild-stall wings at domain of post-stall angles of attack and specifically the option of landing at stall at reduced airspeeds with increased glide angles employing the feature of the airbrake concept according to the above aspects of the presently disclosed subject matter.

Figure 19:
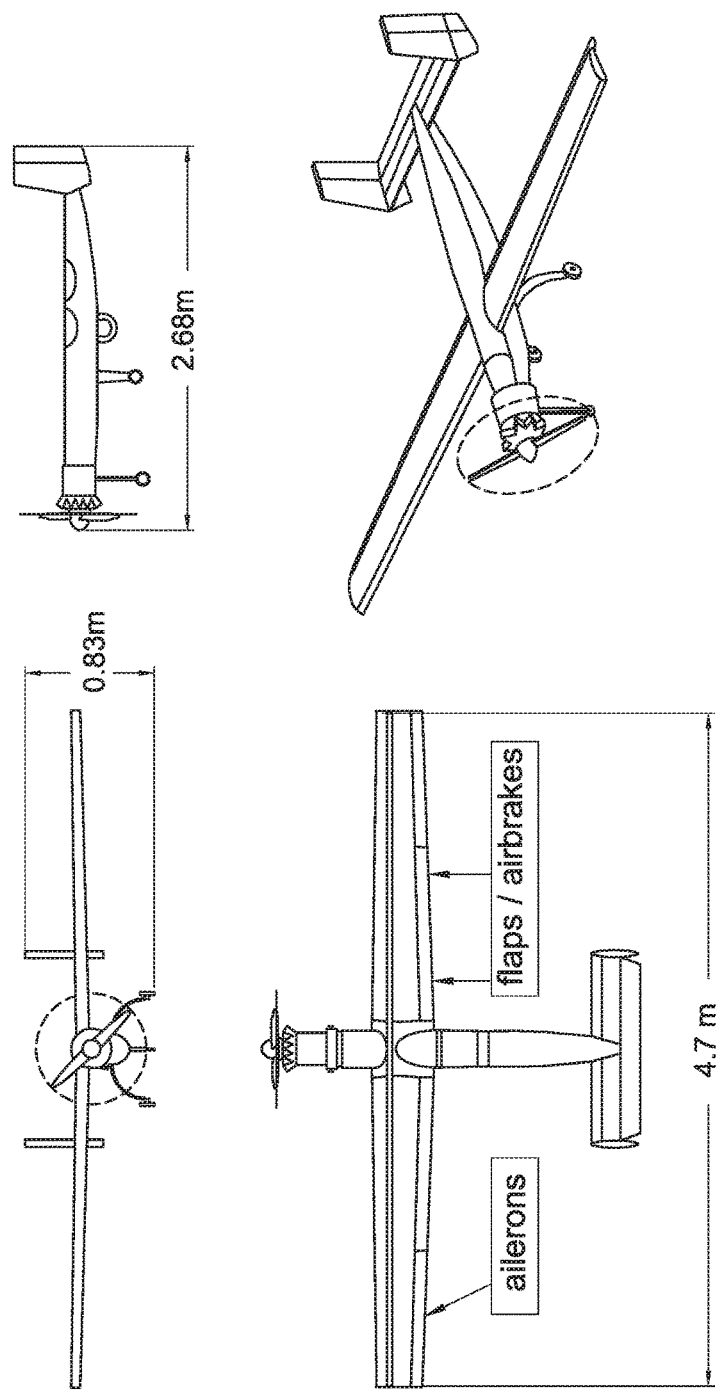
FIG. 19 illustrates the geometry and general dimensions of UAV AK-60.

The UAV AK-60 has a conventional wing-body-tail arrangement that is shown in FIG. 19, which also shows various overall dimensions of this UAV. The main wings of the UAV AK-60 configuration were high-lift, mild-stall wings, comprising airfoil sections corresponding to airfoil SA-MS/17-MLS (see FIGS. 5 to 7(c)), which included the feature of the airbrake concept according to the above aspects of the presently disclosed subject matter.

Two technical objectives were specified for development of UAV AK-60. The first one was of a primary nature—demonstration of advantages of landing at stall at reduced airspeeds and with relatively steep glide angles via implementation of innovative design concepts (high-lift, mild-stall wing, the feature of the airbrake concept according to the above aspects of the presently disclosed subject matter). The second one was of supplementary nature—verification of flight safety and validation of acceptable flying qualities up to high post-stall angles of attack.

The primary objective of the demonstration was supported by the following elements:
 large wing area/low wing loading for providing reduced airspeeds at all stages of the flight;
 implementation of high-lift, mild-stall SA-MS aerofoil-based wing and elimination of speed safety margin $V_{flight}>1.2V_{stall}$;
 the use of high-lift devices for producing high maximum lift (actually maximum usable lift because of elimination of speed safety margin);
 implementation of the feature of the airbrake concept according to the above aspects of the presently disclosed subject matter for providing increased glide angles at approach to landing without penalizing lift and maximum lift characteristics at post-stall angles of attack and retaining reduced airspeeds with deployed airbrake.

The concept of landing at stall was evaluated in a number of flight tests of UAV AK-60 with a slotted mild stall wing and including the feature of the airbrake concept according to the above aspects of the presently disclosed subject matter. Most of flight testing was performed with a slotted mild stall wing based on airfoil SA-MS/17MLS, incorporating the feature of the airbrake concept according to the above aspects of the presently disclosed subject matter. A limited number of flight tests were performed with a slotted mild stall wing that was based on a single element high lift airfoil (as disclosed in U.S. Pat. No. 7,992,827, "Wings for Aircraft", Ref. 6).

Figure 20:
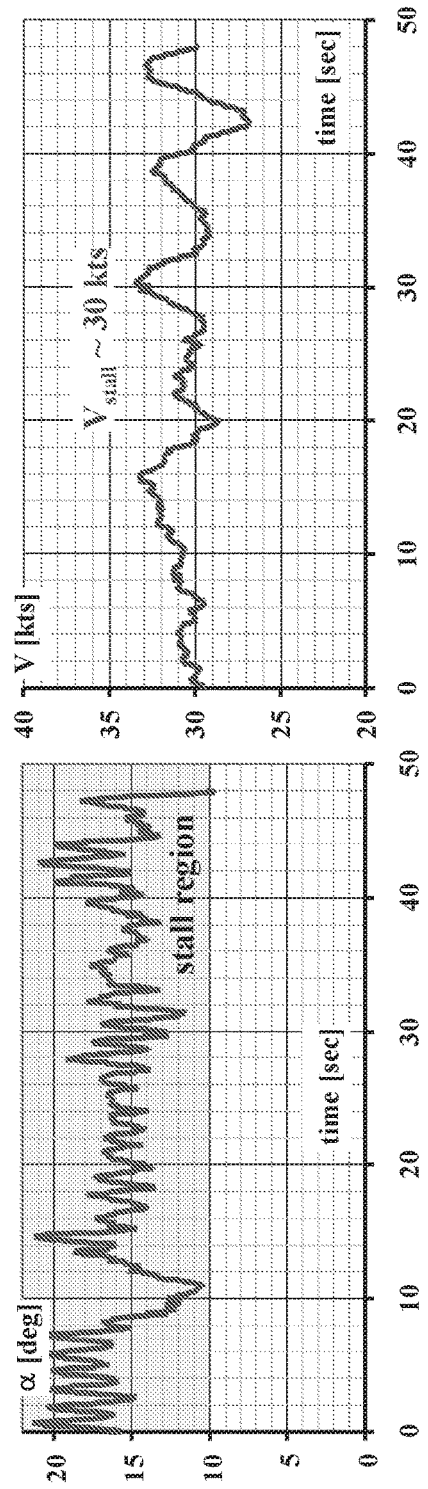
FIGS. 20(a) and 20(b) illustrate flight test results of angle of attack variation with time, and stall velocity variation with time, respectively, obtained with the UAV AK-60, at post-stall angles of attack and flap angle +10°.

The evaluation yielded the following results:
 Flight at post-stall angle of attack (α~15°)
  Characteristics of the flight at post-stall angles of attack of about 15° are shown in FIG. 20(a) and FIG. 20(b).

As anticipated by the inventors, the average airspeed at post-stall was close to stalling speed of $V_{stall}$~30 kts.

Landing at stall

Approach to landing at post-stall angles of attack is shown in FIGS. 21(*a*) to 21(*d*), for flap deflection angle $\delta_{flap}$=+20°, and FIGS. 22(*a*) to 22(*d*), for flap deflection angle corresponding to airbrake mode, $\delta_{brake}$=+60°. For both cases the approach to landing was performed at a respective angle of attack corresponding to the middle of post stall plateau range of lift coefficients (because of the nose-down tendency of the air vehicle at high angle of attack), with an elevator deflection angle $\delta_{el}$ of −12°, and with the engine setting of the air vehicle at idle. Comparison of FIG. 21(*b*) with FIG. 22(*b*) clearly show a 50% numerical increase in the glide angle γ, which increased (in a negative angular direction) from −8° at flap deflection angle of +20°, to −12° at flap deflection angle of +60°. Similarly, comparison of FIG. 21(*d*) with FIG. 22(*d*) clearly show an 18% increase in the rate of descent (ROD), which increased from 490 ft/sec at flap deflection angle of +20°, to 580 ft/sec at flap deflection angle of +60°. These improvements in glide angle and rate of descent were achieved without affecting the approach airspeed of the air vehicle, and inventors suggest that this indicates that the incorporation of the feature of the airbrake concept according to the above aspects of the presently disclosed subject matter to high lift mild stall wings does not distort the variation of lift coefficient with angle of attack at the post-stall plateau of lift coefficients of mild stall wings, and moreover retains the maximum lift coefficient of the baseline wing configuration at conventional flap deflection angles of about +20°. Thus, the feature of the airbrake concept according to the above aspects of the presently disclosed subject matter did not adversely affect the airspeed of the air vehicle, and improved significantly the glide angles and rate of descent of the air vehicle.

The Concept of Landing at Stall/Post-Stall with New Airbrake

The airbrake concept according to the above aspects of the presently disclosed subject matter supports a corresponding innovative approach of UAV landing, in which the UAV lands with reduced airspeeds and steep glide angles.

The airbrake concept according to at least some of the above aspects of the presently disclosed subject matter allows for providing a method of operation of air vehicles, such as for example tactical UAVs, at approach to landing and integrates the following features (see FIG. 23):

two-element, high-lift mild-stall wing that provides a plateau of high-lift coefficients up to high post-stall angles of attack and allows elimination of standard speed safety margin $V_{flight}$>1.2$V_{stall}$. This allows the approach airspeed to be reduced below the above standard speed margin and provide greater lift. This supports the concept of landing at stall, benefiting from maximum usable lift for reduction of airspeed at approach to landing to stall speeds, and providing high level of drag for enhancing glide angles at final stages of approach to landing (high level of induced drag at high lift coefficients and increased parasite drag at post-stall angles of attack due to flow separation).

the airbrake concept according to at least some of the above aspects of the presently disclosed subject matter that generates very high level of drag without penalizing lift characteristics of mild-stall wing at post-stall angles of attack (see FIG. 24). This allows increased glide angles at approach to landing without compromising on UAV airspeed.

Thus, the combination of features of high-lift, mild-stall wing and the airbrake concept according to at least some of the above aspects of the presently disclosed subject matter) provides novel methods of operation of air vehicles, in particular UAV including landing at reduced airspeeds and relatively steep glide angles, which in turn helps to achieve short landing distance and provides the capability to avoid ground obstacles at the final stages of approach to landing.

On the other hand it is to be noted that the airbrake concept according to at least some other of the above aspects of the presently disclosed subject matter can be integrated in other types of slotted wings which are not necessarily mild stall or high lift mild stall wings. In such cases, this allows for providing a method of operation of air vehicles, such as for example tactical UAVs, at approach to landing that provides high drag when the airbrake is deployed, without comprising lift, thereby allowing for relatively steep glide angles, although in such cases the standard speed safety margin $V_{flight}$>1.2$V_{stall}$ is maintained.

The SA-MS aerofoil sections for the wing 10 can be designed in any suitable manner, for example based on the methods as disclosed in U.S. Pat. No. 8,109,473 or U.S. Pat. No. 7,992,827, mutatis mutandis, these references being incorporated herein in their entirety, and incorporating the axial overlap as disclosed herein.

For example, it is possible to start with a known slotted aerofoil design that can be close in characteristics to that required, for example camber, thickness to chord ratio, and so on. Alternatively, a baseline aerofoil can be designed using known methods. Then, the baseline aerofoil contour can be modified to provide a relatively blunt leading edge to obtain high lift, and a suction surface that is cambered and/or has a thickness distribution such as to provide slowly creeping trailing edge separation. Then, the profile of a downstream portion of the suction surface of the leading element of the slotted aerofoil is changed so as to provide a local curvature ($1/r_{local}$) that in some parts thereof increases, and/or in other parts thereof remains substantially constant; at the same time, the longitudinal overlap between the primary element and the secondary element is chosen according to the presently disclosed subject matter. CFD methods can be used, for example, to test the aerofoil, which can then be modified further, and again tested to determine whether the modification is providing the required aerodynamic effect. A number of such trial and error iterations can be carried out until a suitable profile for the aerofoil, providing the required characteristics, is achieved.

The full span of the half-wing 10 can comprise the same aerofoil profile (scaled if necessary according to the aspect ratio, for example), save possibly for aerodynamic or structural features such as booms, wing tip winglets and the like, for example, in a similar manner to the configuration of regular slotted aerofoils along the wing span of the IAI Heron, for example, mutatis mutandis. Alternatively, different portions of the half-wing 10 can comprise different aerofoil profiles, suitably blended along the span or optionally comprising a flow separation plate or the like separating the various wing portions.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed certain examples in accordance with the presently disclosed subject matter, it will be appreciated that many changes can be made therein without departing from the spirit of the presently disclosed subject matter.

The invention claimed is:

1. A two element aerofoil having an aerofoil chord, the two element aerofoil comprising:
    a primary element having a first leading edge and a first trailing edge; and
    a secondary element having a second leading edge and a second trailing edge;
    wherein the primary element and the secondary element define a gap therebetween; and
    wherein the first trailing edge and the second leading edge define an axial overlap therebetween;
    wherein the secondary element is deflectable with respect to the primary element about a fixed hinge point by a flap deflection angle, said fixed hinge point being at an outwardly displaced position with respect to a pressure surface of the secondary element;
    wherein the secondary element being configured to operate in airbrake mode when deflected by a respective said flap deflection angle corresponding to a design airbrake deflection angle to generate an airbrake drag;
    wherein said design airbrake deflection angle is greater than 40°;
    wherein for said design airbrake deflection angle said axial overlap is numerically greater than −0.5% of the aerofoil chord.

2. The two element aerofoil according to claim 1, wherein said design airbrake deflection angle is at least one of: greater than 45°; or greater than 55°.

3. The two element aerofoil according to claim 1, wherein said airbrake drag corresponds to an airbrake aerofoil drag coefficient that is at least 150% greater than a datum drag coefficient of the aerofoil at a zero said flap deflection angle.

4. The two element aerofoil according to claim 3, wherein said airbrake aerofoil drag coefficient is greater than at least one of: 0.15; 0.2; or 0.3.

5. The two element aerofoil according to claim 1, wherein the primary element is configured for providing high lift mild stall characteristics, and wherein the two element aerofoil is configured to generate said airbrake drag while concurrently retaining said mild stall characteristics.

6. The two element aerofoil according to claim 1, wherein at least for said design airbrake deflection angle said axial overlap is between −0.5% and +4% of the aerofoil chord.

7. The two element aerofoil according to claim 1, wherein at least one of:
    said axial overlap provides a smooth variation of aerofoil maximum lift coefficient with said flap deflection angle for a range of said flap deflection angles at least ±10° from said design airbrake deflection angle; or
    at said axial overlap, the aerofoil maximum lift coefficient is maintained constant within 0.1 with said flap deflection angle for a range of said flap deflection angles at least ±10° from said design airbrake deflection angle.

8. The two element aerofoil according to claim 1, wherein a value for said axial overlap is chosen to maximize the maximum lift coefficient obtained for the aerofoil at said design airbrake deflection angle.

9. The two element aerofoil according to claim 1, wherein at least one of:
    said secondary element is in the form of a slotted flap; or
    the secondary element is deflectable with respect to the primary element about said fixed hinge point to provide said flap deflection angle ranging between about −15° and +60°.

10. The two element aerofoil according to claim 1, wherein at least one of:
    at said design airbrake deflection angle, at least a majority of an airflow over said secondary element is fully detached;
    at said design airbrake deflection angle said aerofoil generates a maximum lift coefficient greater than 2.5;
    said design airbrake deflection angle corresponds to a design Reynolds number of between $0.3*10^6$ and $1.0*10^6$; or
    said design airbrake deflection angle corresponds to a design Reynolds number of $0.4*10^6$.

11. A wing having aerofoil sections corresponding to the two element aerofoil of claim 1.

12. An air vehicle comprising wings, each of said wings having aerofoil sections corresponding to the two element aerofoil of claim 1.

13. A two element aerofoil having an aerofoil chord, the two element aerofoil comprising:
    a primary element having a first leading edge and a first trailing edge;
    a secondary element having a second leading edge and a second trailing edge;
    wherein the primary element and the secondary element defining a gap therebetween; and
    wherein the first trailing edge and the second leading edge define an axial overlap therebetween;
    wherein the secondary element is deflectable with respect to the primary element about a fixed hinge point by a flap deflection angle, said fixed hinge point being at an outwardly displaced position with respect to a pressure surface of the secondary element;
    wherein the secondary element is configured to operate in airbrake mode when deflected by a respective said flap deflection angle corresponding to a design airbrake deflection angle wherein to generate an airbrake drag;
    wherein said design airbrake deflection angle is greater than 40°;
    wherein a value for said axial overlap is chosen to maximize the maximum lift coefficient obtained for the aerofoil at said design airbrake deflection angle.

14. A method for landing an air vehicle, the air vehicle comprising wings having aerofoil sections, each said aerofoil cross-section comprising a two element aerofoil, having an aerofoil chord, a primary element having a first leading edge and a first trailing edge, a secondary element having a second leading edge and a second trailing edge, a gap between the primary element and the secondary element, and an axial overlap between the first trailing edge and the second leading edge, the secondary element being deflectable with respect to the primary element about a fixed hinge point by a flap deflection angle, said fixed hinge point being at an outwardly displaced position with respect to a pressure surface of the secondary element, the secondary element being configured to operate in airbrake mode when deflected by a respective said flap deflection angle corresponding to a design airbrake deflection angle wherein to generate an airbrake drag, wherein said design airbrake deflection angle is greater than 40°; wherein at least for said design airbrake deflection angle said axial overlap is numerically greater than −0.5% of the aerofoil chord, the method comprising:
    maximizing glide angle including:

deflecting the secondary element to said design airbrake deflection angle to provide said airbrake drag; and reducing airspeed of the air vehicle to maximize lift.

15. The method according to claim 14, wherein the two element aerofoil is configured to generate large values of drag concurrently with high lift to maintain low values of the lift-to-drag ratio (L/D), and thereby provide high values of glide angle $\gamma$.

16. The method according to claim 15, wherein said glide angle $\gamma$ is the range of between about 3° and about 15°, or in the range of between 10° and about 15°.

17. The method according to claim 15, wherein said glide angle $\gamma$ is maximized to minimize exposure time of the air vehicle during landing thereof.

18. The method according to claim 15, wherein said glide angle $\gamma$ is chosen to compensate for tall obstacles are located in the vicinity or perimeter of the landing site for the air vehicle.

19. The method according to claim 15, wherein said glide angle $\gamma$ is controllably selected during landing to provide a desired precision for the touchdown point.

20. The method according to claim 14, wherein the two element aerofoil is configured to provide high-lift mild stall characteristics, and wherein prior to landing the air vehicle is flown with an absence of a conventional speed safety margin.

21. The method according to claim 14, wherein the two element aerofoil is configured to provide high-lift mild stall characteristics, and wherein prior to landing the air vehicle is flown at post-stall angles of attack maintaining high levels of lift.

22. A method for designing a two element aerofoil, having an aerofoil chord, a primary element having a first leading edge and a first trailing edge, a secondary element having a second leading edge and a second trailing edge, a gap between the primary element and the secondary element, and an axial overlap between the first trailing edge and the second leading edge, the secondary element being deflectable with respect to the primary element about a fixed hinge point by a flap deflection angle, said fixed hinge point being at an outwardly displaced position with respect to a pressure surface of the secondary element, the secondary element being configured to operate in airbrake mode when deflected by a respective said flap deflection angle corresponding to a design airbrake deflection angle wherein to generate an airbrake drag, wherein said design airbrake deflection angle is greater than 40°; the method comprising:

at least for said design airbrake deflection angle, setting said axial overlap to be numerically greater than −0.5% of the aerofoil chord.

23. A method for designing a two element aerofoil, having an aerofoil chord, a primary element having a first leading edge and a first trailing edge, a secondary element having a second leading edge and a second trailing edge, a gap between the primary element and the secondary element, and an axial overlap between the first trailing edge and the second leading edge, the secondary element being deflectable with respect to the primary element about a fixed hinge point by a flap deflection angle, said fixed hinge point being at an outwardly displaced position with respect to a pressure surface of the secondary element, the secondary element being configured to operate in airbrake mode when deflected by a respective said flap deflection angle corresponding to a design airbrake deflection angle wherein to generate an airbrake drag, wherein said design airbrake deflection angle is greater than 40°; the method comprising:

defining a value for said axial overlap such as to maximize the maximum lift coefficient obtained for the aerofoil at said design airbrake deflection angle.

* * * * *